US010587098B2

(12) United States Patent
Johnson et al.

(10) Patent No.: US 10,587,098 B2
(45) Date of Patent: Mar. 10, 2020

(54) MEDIUM VOLTAGE SWITCHGEAR ENCLOSURE

(71) Applicants: Bethel Idiculla Johnson, Attleboro, MA (US); Brad Bell, New Buffalo, MI (US)

(72) Inventors: Bethel Idiculla Johnson, Attleboro, MA (US); Brad Bell, New Buffalo, MI (US)

(73) Assignee: Switchboard Apparatus, Inc., Elmhurst, IL (US)

(*) Notice: Subject to any disclaimer, the term of this patent is extended or adjusted under 35 U.S.C. 154(b) by 0 days.

(21) Appl. No.: 15/794,208

(22) Filed: Oct. 26, 2017

(65) Prior Publication Data

US 2018/0090914 A1 Mar. 29, 2018

Related U.S. Application Data

(62) Division of application No. 15/276,163, filed on Sep. 26, 2016.

(51) Int. Cl.
*H02B 1/04* (2006.01)
*H02B 13/02* (2006.01)
(Continued)

(52) U.S. Cl.
CPC ............... *H02B 1/04* (2013.01); *H01H 33/66* (2013.01); *H02B 1/20* (2013.01); *H02B 1/30* (2013.01);
(Continued)

(58) Field of Classification Search
None
See application file for complete search history.

(56) References Cited

U.S. PATENT DOCUMENTS 2,563,441 A * 8/1951 Wood .................. H02B 11/133
174/50
3,958,156 A 5/1976 Tjebben
(Continued)

FOREIGN PATENT DOCUMENTS

CN 203596533 5/2014
DE 3915948 11/1990
(Continued)

OTHER PUBLICATIONS

Siemens Switchgear Selection and Application Guide, 2012, pp. 1-52.

(Continued)

*Primary Examiner* — Courtney L Smith
(74) *Attorney, Agent, or Firm* — Vedder Price, P.C.

(57) ABSTRACT

An electrical enclosure where all functional compartments are accessible only from a front and the enclosure has a width that is no greater than twenty-four inches. Plenum chambers provide an exit path from releasing gas pressure and particulate matter generated during an arc flash event within the enclosure and prevent the gases and particulate matter from entering the other compartments. A vacuum circuit breaker compartment may include insulator bushings and current transformers that are each individually removable from a front of the enclosure. A removably connected roof panel permits selective front accessibility to the bus bar compartment through the plenum chamber and a flap movably connected to the bus bar compartment. A wall of the cable connection compartment includes an opening and a portion of a wall of the voltage transformer compartment is removably connected to facilitate access to the cable connection compartment from a front of the enclosure. An interlock assembly is selectively configurable to facilitate (Continued)

Figure 1:
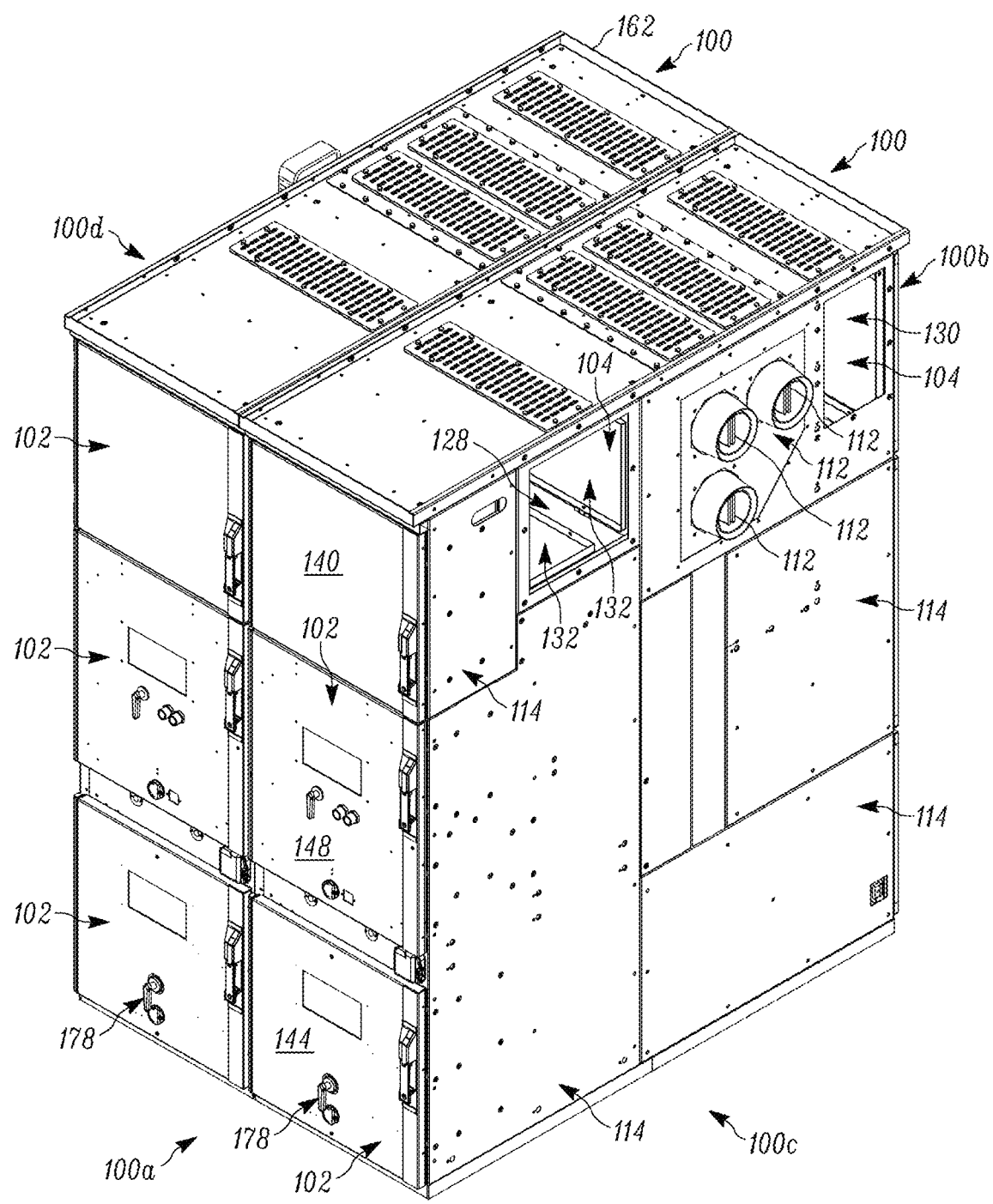

control over movement of the voltage transformer and the door by disconnected, test and service configurations.

8 Claims, 16 Drawing Sheets

(51) Int. Cl.
*H01H 33/66* (2006.01)
*H02B 1/20* (2006.01)
*H02B 1/30* (2006.01)
*H02B 1/56* (2006.01)
*H02B 11/10* (2006.01)
*H02B 11/12* (2006.01)
*H02B 11/26* (2006.01)
*H02B 13/025* (2006.01)

(52) U.S. Cl.
CPC ............. *H02B 1/306* (2013.01); *H02B 1/565* (2013.01); *H02B 13/02* (2013.01); *H02B 11/10* (2013.01); *H02B 11/12* (2013.01); *H02B 11/26* (2013.01); *H02B 13/025* (2013.01)

(56) References Cited

U.S. PATENT DOCUMENTS

| | | | |
|---|---|---|---|
| 4,105,136 A | 8/1978 | May | |
| 4,862,324 A | 4/1989 | Kalvaltis et al. | |
| 5,757,260 A | 5/1998 | Smith et al. | |
| 6,066,814 A | 5/2000 | Smith et al. | |
| 6,215,654 B1 | 4/2001 | Wilkie, II et al. | |
| 6,410,844 B1 | 6/2002 | Bruner et al. | |
| 7,236,352 B2 | 6/2007 | Dalis | |
| 7,679,022 B2 | 3/2010 | Tsuchiya et al. | |
| 7,821,774 B2 | 10/2010 | Josten et al. | |
| 7,974,078 B2 | 7/2011 | Coomer et al. | |
| 8,101,881 B2 | 1/2012 | Miller et al. | |
| 8,242,395 B2 | 8/2012 | Josen et al. | |
| 8,451,589 B2 | 5/2013 | Milovac et al. | |
| 8,482,903 B2 | 7/2013 | Milovac et al. | |
| 8,733,855 B2 | 5/2014 | Josten et al. | |
| 9,166,384 B2 * | 10/2015 | Kobayashi | H02B 1/54 |
| 9,620,938 B2 * | 4/2017 | Yang | H02B 1/30 |
| 2011/0299228 A1 * | 12/2011 | Milovac | H02B 11/26 361/614 |
| 2014/0368976 A1 * | 12/2014 | Wu | H02B 11/04 361/605 |
| 2018/0090914 A1 * | 3/2018 | Johnson | H01H 33/66 |

FOREIGN PATENT DOCUMENTS

| | | |
|---|---|---|
| JP | H0530615 | 2/1993 |
| JP | 2013215062 | 10/2013 |
| WO | 1994024744 | 10/1994 |
| WO | 2009001425 | 12/2008 |

OTHER PUBLICATIONS

Medium Voltage Switchgear and Controlgear; Mitsubishi Electric; Apr. 2008; 15 pgs.
Medium Voltage Switchgear; Medium Voltage Air-insulated Double tiered Switchgear with Vacuum Circuit Breaker; Hitachi IE Systems Co., Ltd.; 19 pgs.

* cited by examiner

MEDIUM VOLTAGE SWITCHGEAR ENCLOSURE

CROSS-REFERENCE TO RELATED APPLICATIONS

This application is a divisional application that claims priority to and the benefit of co-pending U.S. patent application Ser. No. 15/276,163, entitled "Medium Voltage Switchgear Enclosure," which was filed on Sep. 26, 2016, the disclosure of which is incorporated herein by reference.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE DISCLOSURE

(1) Field of the Disclosure

The present disclosure generally relates to an electrical enclosure. More particularly, the present disclosure relates to an electrical enclosure where all functional compartments defined within the enclosure are accessible only from the front of the enclosure.

(2) Description of Related Art Including Information Disclosed Under 37 CFR 1.97 and 1.98

Medium voltage electrical components, such as circuit breakers, potential transformers, current transformers, control power transformers, etc., operate, as conventionally understood by one of skill in the art, in a range of about 1,000 volts to about 35,000 volts. A conventional front accessible medium switchgear assembly includes at least a pair of sections (i.e., each an individual metal cabinets having a plurality of compartments) separated from one another by a vertical metal barrier. Each section includes a low voltage compartment and at least one compartment for a medium voltage electrical component both disposed immediately behind doors at the front of the section, and a bus bar compartment disposed in a rear portion of the section, behind low voltage and medium voltage electrical components. At least one of the sections includes a cable connection compartment disposed immediately behind a door at the front of the applicable section. The bus bar compartment and cable connection compartment are configured to extend into immediately adjacent sections. As a result, a conventional medium voltage switchgear assembly occupies a large amount of floor space (i.e., at least two sections width), and requires front and rear access for operation and maintenance (i.e., clearance space at the rear in addition to that required by code, law or regulation). As such, maintenance and space considerations are driving factors in the design of new medium voltage switchgear enclosures, components and equipment. There is a need for constructing a medium voltage switchgear enclosure that makes efficient use of the available floor space and minimizes the time required for inspection, repair and maintenance of components accommodated therein (i.e., requires only a single, front-accessible section).

A certain amount of space is required between adjacent structures, such as walls, and the medium voltage switchgear assembly per the national electric code (NEC) and other local codes. However, allocation of available space is a critical factor in industrial applications, data center facilities and marine equipment, where space is limited and at a premium. Often, an entire room is necessary to be allocated for a bank of medium voltage switchgear assemblies. Consequently, such an allocation of a substantial amount of space, for example, an entire room for the medium voltage switchgear assemblies, each including a plurality of sections, is an undesirable and inefficient use of valuable floor space, especially in healthcare and data-center facilities.

One of skill in the art recognizes that a medium voltage switchgear assembly can be damaged due to an arc flash incident, which is an explosion caused by arcing that generates enormous pressure and temperature within a switchgear assembly that results in significant economic loss due to interruption of energy distribution, and damage of the switchgear assembly and the components or equipment accommodated in the switchgear cabinet. Consequently, maintenance personnel inspecting and servicing the switchgear assembly have to wear protective gear that is bulky and expensive. A typical arc resistant switchgear assembly tends to be very large, for example, each section is 36 inches wide and 94 inches deep and often have heavy sheet metal enclosures, including a continuous vertical metal barrier between adjacent sections of the switchgear assembly. Such switchgear assemblies have multiple sections and consequently require significant space. Some switchgear assemblies employ an external arcing chamber that limits the configuration of components, equipment, etc., within the switchgear assembly.

Conventional medium voltage switchgear assemblies available in markets, for example, in Europe and Asia are built in accordance with the International Electrotechnical Commission (IEC) standards, and in the North American market need to meet stringent Institute of Electrical and Electronics Engineers (IEEE) requirements, American National Standards Institute (ANSI) and Underwriters Laboratories (UL) requirements. However, these switchgear assemblies have cable connection and bus bar compartments disposed in the rear of each section that are not configured to be accessible from the front and, therefore, make it difficult to install and service electrical components and the bus bars accommodated within these switchgear assemblies, as currently configured. Furthermore, conventional switchgear assemblies built to ANSI standards utilize ring type current transformers that are mounted in such a way that the circuit breaker primary connector arm passes through the transformers when in the connect position. The current transformers are mounted in the circuit breaker compartment behind the shutter between the circuit breaker poles making it difficult to install relay class current transformers in conventional switchgear assemblies that require separate sections for metering and protection. Consequently, there is a need for easy accessibility to the cable connection and bus bar compartments from the front of a new switchgear enclosure (i.e., requires only a single, front-accessible section). Furthermore, there is a need for mounting separate current transformers for each phase with higher burden for relay class applications accessible from the front of the switchgear enclosure for easier accessibility for maintenance and inspection.

Certain conventional switchgear assemblies have attempted to overcome the disadvantage of rear mounted current transformers by incorporating a front-accessible mounting block assembly with limited current transformers configured as a monoblock (i.e., a single, unitary block configuration that accommodates all three phases) including ring or toroidal current transformers, that is adapted to interface with tulip connectors. However, this arrangement presents further disadvantages, in that, removal of the entire monoblock mounting block is required for maintenance and service which is difficult and unwieldy given the actual considerable physical size of these parts. Consequently, there is a need for individually front accessible high accuracy class current transformers for each individual phase.

Conventional ANSI switchgear assemblies do not have or require that the door of the circuit breaker or the voltage transformer be interlocked with the truck mounted unit devices (VCB or VT). This type of arrangement enables the operator to open the door while the voltage transformer is energized and delivering electrical power. Further, this also permits racking in and out operation of the voltage transformer truck and any one of these actions can trigger operational hazards in the event an arc fault is initiated inside the voltage transformer compartment. Consequently, there is a need for an interlocked door for the voltage transformer compartment that insures operator safety. A door interlock that is in communication with the truck would advantageously prevent opening the door when the voltage transformer is in the energized position and the racking in and out operation of the voltage transformer with the door in the open position and provides a shield that prevents discharge in the event of an arc fault.

Therefore, there is a long felt but unresolved need for an arc resistant front accessible metal clad switchgear enclosure that has all necessary medium switchgear components in a single section with a compact footprint and provides front access to all functional compartments, i.e., low voltage control compartment, vacuum circuit breaker compartment, voltage transformer compartment, cable connection compartment and bus bar compartment, and the respective electrical components and equipment accommodated in the medium voltage switchgear enclosure for inspection, testing and maintenance with limited space requirements and without protective gear.

BRIEF SUMMARY OF THE DISCLOSURE

This summary is provided to introduce a selection of concepts in a simplified form that are further described in the detailed description of the disclosure. This summary is not intended to identify key or essential inventive concepts of the claimed subject matter, nor is it intended for determining the scope of the claimed subject matter.

Generally, an electrical enclosure, as disclosed herein may include an enclosure where all functional compartments defined within the enclosure are accessible from the front of the enclosure.

In one aspect of the present disclosure, a front accessible switchgear enclosure may include a plurality of discrete functional compartments wherein all compartments are accessible only from a front of the enclosure and the enclosure has a width that is no greater than twenty-four inches for 1200 amp rated cabinets or thirty inches for 2000 amp rated cabinets.

The enclosure may include various different compartments, including, without limitation, a low voltage control compartment, a vacuum circuit breaker compartment, a voltage transformer compartment, a cable connection compartment and a bus bar compartment.

The enclosure may define a front and rear plenum chambers that provide an exit path from releasing pressure, gases and particulate matter generated by electrical components accommodated in the compartments during an arc flash event within the enclosure. Flaps and/or direct arc flash vent paths may be provided between the compartments and the plenum chambers for preventing the gases and particulate matter from entering the other compartments.

The vacuum circuit breaker compartment may include an opening in communication with the bus bar compartment and a plurality of individually removable insulator bushings that cooperatively cover the opening where the bushings include a portion that extends into the vacuum circuit breaker compartment and a portion that extends into the bus bar compartment.

The bus bar compartment may include a plurality bus spouts that each extend through one of the insulator bushings into the vacuum circuit breaker compartment and a plurality of individually removable current transformers that a portion of each bushing extends through, so that each individual current transformer is accessible from a front of the enclosure by removal of the respective bushing from the vacuum circuit breaker compartment.

A plenum chamber may be disposed between the low voltage control compartment and the bus bar compartment so that a removably connected roof panel permits selective front accessibility to the bus bar compartment through the plenum chamber and a flap movably connected to the bus bar compartment.

In another aspect of the present disclosure, each of the low voltage control compartment, the vacuum circuit breaker compartment, and the voltage transformer compartment may include a front wall, wherein a lower door is movably connected to the front wall of the voltage transformer compartment, a middle door is movably connected to the front wall of the vacuum circuit breaker compartment and an upper door is movably connected to the front wall of the low voltage control compartment, the enclosure defines plenum chambers providing an exit path from releasing pressure, gases and particulate matter generated by electrical components accommodated in the compartments during an arc flash event within the enclosure, the bus bar compartment is disposed above the cable connection compartment and rearwardly of the front plenum chamber, the cable connection compartment is disposed rearwardly of the voltage transformer compartment, a direct arc flash vent path is defined between the vacuum circuit breaker compartment and the front plenum chamber, between the cable connection compartment and a rear plenum chamber and between the bus bar compartment and the front and rear plenum chamber, the vacuum circuit breaker compartment includes an opening in communication with the bus bar compartment so that a plurality of individually removable current transformers are selectively connected to the bus bar compartment and are individually accessible through the opening from the front of the enclosure, and a roof panel that is removably connected to the enclosure so as to permit selective front accessibility to the bus bar compartment through the front plenum chamber and a flap movable connected to the bus bar compartment.

A method of accessing a bus bar compartment of a front accessible switchgear enclosure including a low voltage control compartment, wherein each of the bus bar compartment and the low voltage compartment include a plurality of walls, including a top wall, to enclose and isolate such compartments from one another and other compartments of the enclosure, wherein a front plenum chamber is disposed between the low voltage control compartment and the bus bar compartment, may include the steps of: moving a roof panel; accessing the front plenum chamber from a front of the enclosure; moving a flap movably connected to the bus bar compartment; and accessing the bus bar compartment through the front plenum chamber and the flap from the front of the enclosure.

In a still further aspect of the present disclosure, a front accessible switchgear enclosure may include a plurality of discrete functional compartments defined within the enclosure, including, without limitation, a voltage transformer compartment and a cable connection compartment which have adjacent contiguous walls, where a wall of the cable connection compartment includes an opening and a portion of a wall of the voltage transformer compartment (that may also include an opening, that may be aligned in registration therewith or such opening may also be formed in the wall of the voltage transformer compartment) is removably connected to facilitate access to the cable connection compartment from a front of the enclosure.

The portion may include an insulator bushing fixed thereto to facilitate connection between a voltage transformer disposed in the voltage transformer compartment and bus spouts disposed in the cable connection compartment.

The front wall of the cable connection compartment may include an opening disposed in registration with other openings and a flap that is movably connected to at least one of the front wall of the cable connection compartment, the rear wall the voltage transformer compartment and the portion of the rear wall to cooperatively define a vent path between the voltage transformer compartment and the cable connection compartment during an arc fault event.

A method of accessing a cable connection compartment of a front accessible switchgear enclosure including a voltage transformer compartment having an adjacent contiguous wall with the cable connection compartment, one or both of which may include an opening, the method may include the steps of: removing a portion of the wall of the voltage transformer compartment that is aligned in registration with the opening; and accessing the cable connection compartment through the voltage transformer compartment and the opening from the front of the enclosure.

In still another aspect of the present disclosure, a front accessible switchgear enclosure may include a plurality of discrete functional compartments defined within the enclosure that are accessible only from a front of the enclosure, including without limitation, a voltage transformer compartment having an opening and a door that is movable between an open position to expose the opening and a closed position to cover the opening. A voltage transformer may be disposed within the voltage transformer compartment that includes a racking mechanism for moving the voltage transformer between a drawn-in or racked-in position and a drawn-out or racked-out position. Preferably, the door includes a lock assembly having a lock link and an interlock assembly that selectively actuates the lock assembly, such that when the interlock assembly is disposed in one of a test configuration and a service configuration, the lock link is disposed in a secure position and when the interlock assembly is disposed in one of a disconnected configuration and the service configuration the racking mechanism is non-actuable.

The interlock assembly may include a door-mounted switch with a rotary handle, having a lock plate that is contiguously engaged so as to move in aligned registration therewith. The lock plate may include a vertex that facilitates contiguous engagement with the switch and from which a pair of arms extend, disposed normal with respect to one another.

The lock link may be pivotally connected to the door and movably connected to an actuation link such that when the lock plate selectively moves the actuation link from a first position where a biasing element is extended to a second position where the biasing element is compressed the lock link is moved from a secure position fixing the door in the closed position to an unsecure position to facilitate the door moving between the open and closed positions.

The disconnected configuration may be defined by the lock link disposed in an unsecured position to facilitate movement of the door between the open and closed positions, and the interface device blocked by the lock plate disposed in aligned registration therewith.

The test configuration may be defined by the lock link disposed in a secured position to fix the door in the closed position, and the interface device unblocked by the lock plate disposed unaligned therewith.

The service configuration may be defined by the lock link disposed in a secured position to fix the door in the closed position, and the interface device blocked by the lock plate disposed in aligned registration therewith.

A method of installing a voltage transformer may include the following steps: providing a plurality of discrete functional compartments, including without limitation a voltage transformer compartment, defined within a front accessible switchgear enclosure that are accessible only from a front of the enclosure, having an opening and a door that is movable between an open position to expose the opening and a closed position to cover the opening; disposing the voltage transformer in a drawn-out or racked-out position, the voltage transformer including a racking mechanism for moving the voltage transformer between a drawn-in or racked-in position and the drawn-out or racked-out position; moving the door to the closed position; actuating an interlock assembly disposed on the door from a disconnected configuration where the racking mechanism in non-actuable to a test configuration where the door is secured in the closed position and the racking mechanism is actuable; actuating the racking mechanism to move the voltage transformer from the drawn-out or racked-out position to the drawn-in or racked-in position; and actuating the interlock assembly from the test configuration to a service configuration where the door is secured in the closed position and the racking mechanism is non-actuable.

A method of removing a voltage transformer may include the following steps: providing a plurality of discrete functional compartments, including without limitation a voltage transformer compartment, defined within a front accessible switchgear enclosure that are accessible only from a front of the enclosure, having an opening and a door that is movable between an open position to expose the opening and a closed position to cover the opening; removing the voltage transformer from the enclosure from a drawn-in or racked-in position, wherein the voltage transformer includes a racking mechanism for moving the voltage transformer between a drawn-in or racked-in position and a drawn-out or racked-out position; actuating an interlock assembly disposed on the door from a service configuration where the door is secured in the closed position and the racking mechanism is non-actuable to a test configuration where the door is secured in the closed position and the racking mechanism is actuable; actuating the racking mechanism to move the voltage transformer from the drawn-in position to the drawn-out position; and actuating the interlock assembly from the test configuration to a disconnected configuration where the racking mechanism in non-actuable and the door is movable from the closed position to the open position.

In still yet a further aspect of the present disclosure, the front accessible switchgear enclosure includes an arc resistant front accessible metal clad switchgear enclosure that has a single section with a compact footprint and provides front access to all functional compartments, and the respective electrical components and equipment are accommodated in the switchgear enclosure assembly for inspection, testing and maintenance with limited space requirements and without protective gear.

The electrical input or output cables enter into or exit from the front accessible switchgear enclosure, for example, via a rear lower compartment in the electrical enclosure referred to as the cable connection compartment. The electrical input or output cables are accessible from the front side of the switchgear enclosure. One or more of the bus bars allow electrical communication between the electrical components within the front accessible switchgear enclosure. One or more of the bus bars also electrically communicate with the electrical cables. The bus bars are electrically connected in the bus bar and cable connection compartments within the enclosure. One or more of the bus bars allow connection to adjacently disposed separate front accessible switchgear enclosures or sections, connection between one or more of the electrical components in the enclosure, connection between the adjacent compartments in the enclosure and in the adjacently disposed separate front accessible switchgear enclosures, and connection to one or more other front accessible switchgear enclosures. The front accessible switchgear enclosure of the present disclosure can be configured to make a single switchgear lineup with multiple enclosures and each enclosure further can be configured as an input or output cabinet with a switchgear having a current rating of, for example, about 2,000 amperes, thereby enabling usage of circuit breakers having current ratings of, for example, about 1,200 amperes and 2,000 amperes in a single line up.

The front accessible switchgear enclosure disclosed herein may also include one or more inspection windows, for example, windows made of a suitable material, such as, tempered glass, positioned at predetermined locations on the front side of the enclosure for providing a front visual indication of the electrical components, the electrical cables, or the bus bars for inspection and maintenance and for scanning critical temperature levels at electrical high voltage connections using an infra-red scanner.

The front accessible switchgear enclosure disclosed herein may further include surge arresters positioned in accordance with legal, code or industry regulations within the enclosure. The surge arresters protect the electrical components, the bus bars, the mounting block assembly, the inspection windows, the electrical input cables, the electrical output cables, and the compartments defined with the enclosure in an event of a lightning surge. The surge arresters are electrically connected to one or more of the bus bars in the cable compartment of the electrical enclosure via short high voltage electrical cables.

BRIEF DESCRIPTION OF THE SEVERAL VIEWS OF THE DRAWING(S)

The foregoing summary, as well as the following detailed description of the disclosure, is better understood when read in conjunction with the appended drawings. For the purpose of illustrating the disclosure, exemplary constructions of the inventions of the disclosure are shown in the drawings. However, the disclosure and the inventions herein are not limited to the specific methods and instrumentalities disclosed herein.

FIG. 1 exemplarily illustrates a perspective view of two front accessible switchgear enclosures, each in accordance with an embodiment of the present disclosure.

Figure 2:
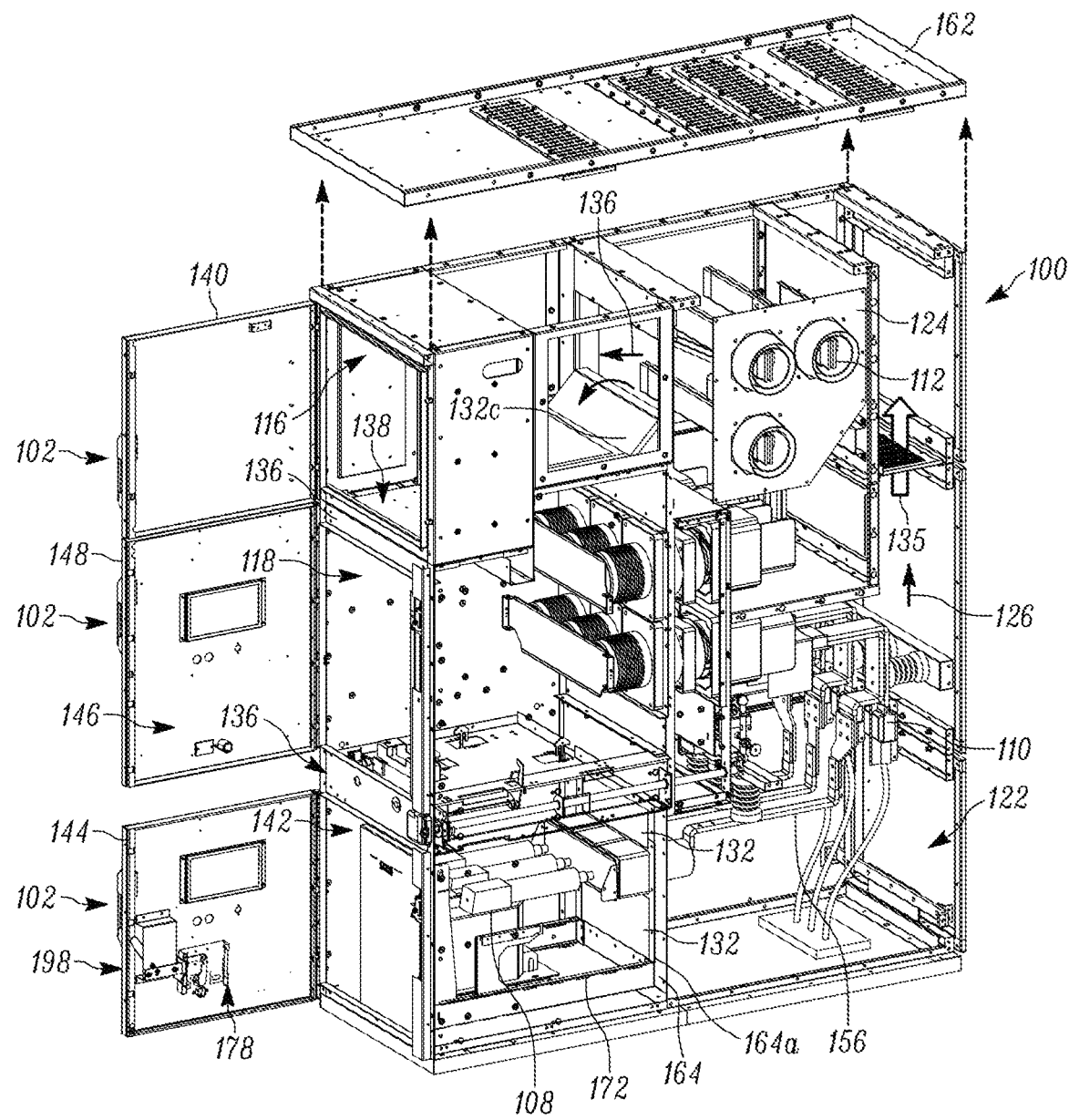

FIG. 2 exemplarily illustrates a side perspective view of one of the front accessible switchgear enclosures of FIG. 1, without side panels for clarity.

Figure 3:
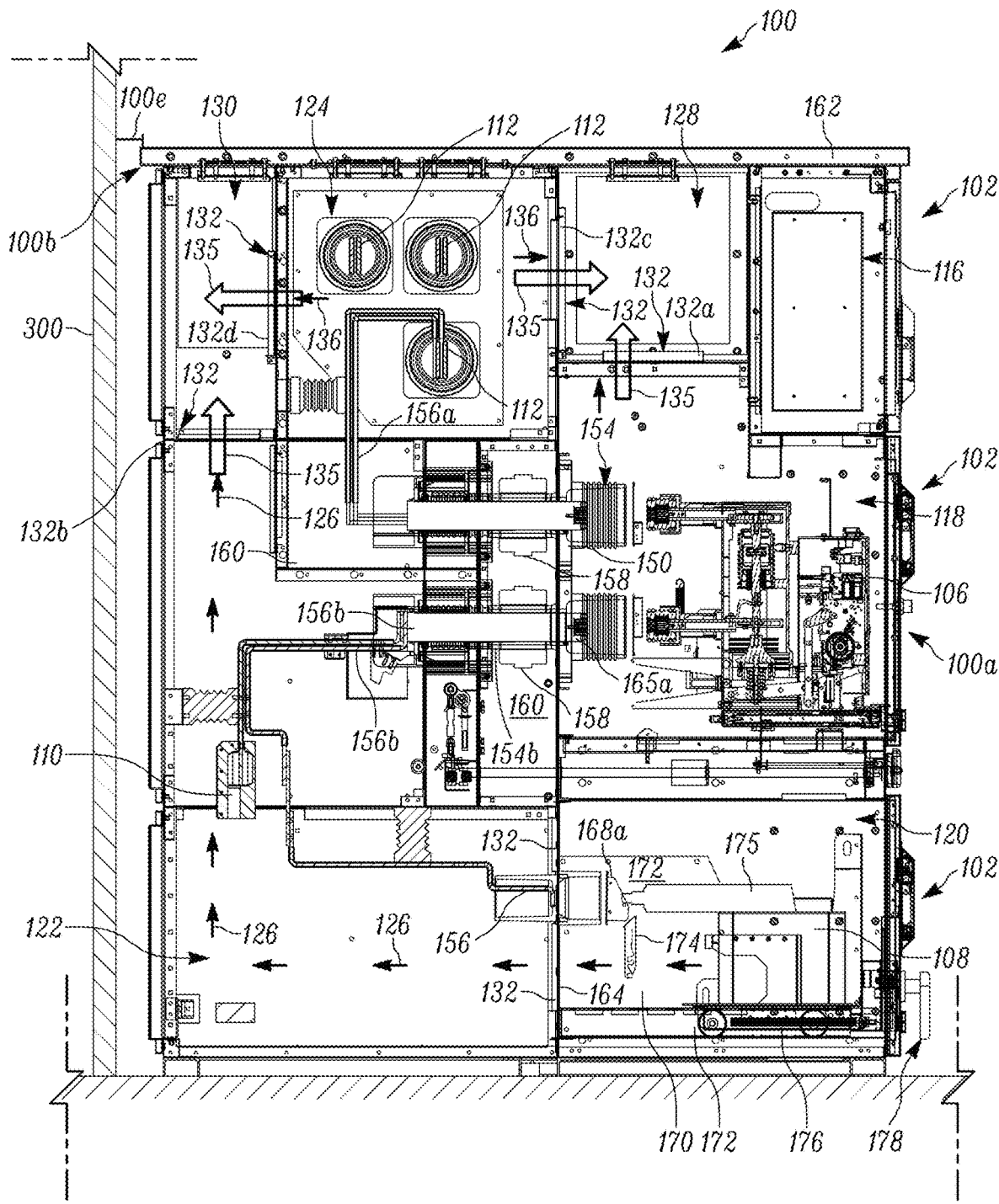

FIG. 3 exemplarily illustrates a side elevation view of the front accessible switchgear enclosure of FIG. 2.

Figure 3A:
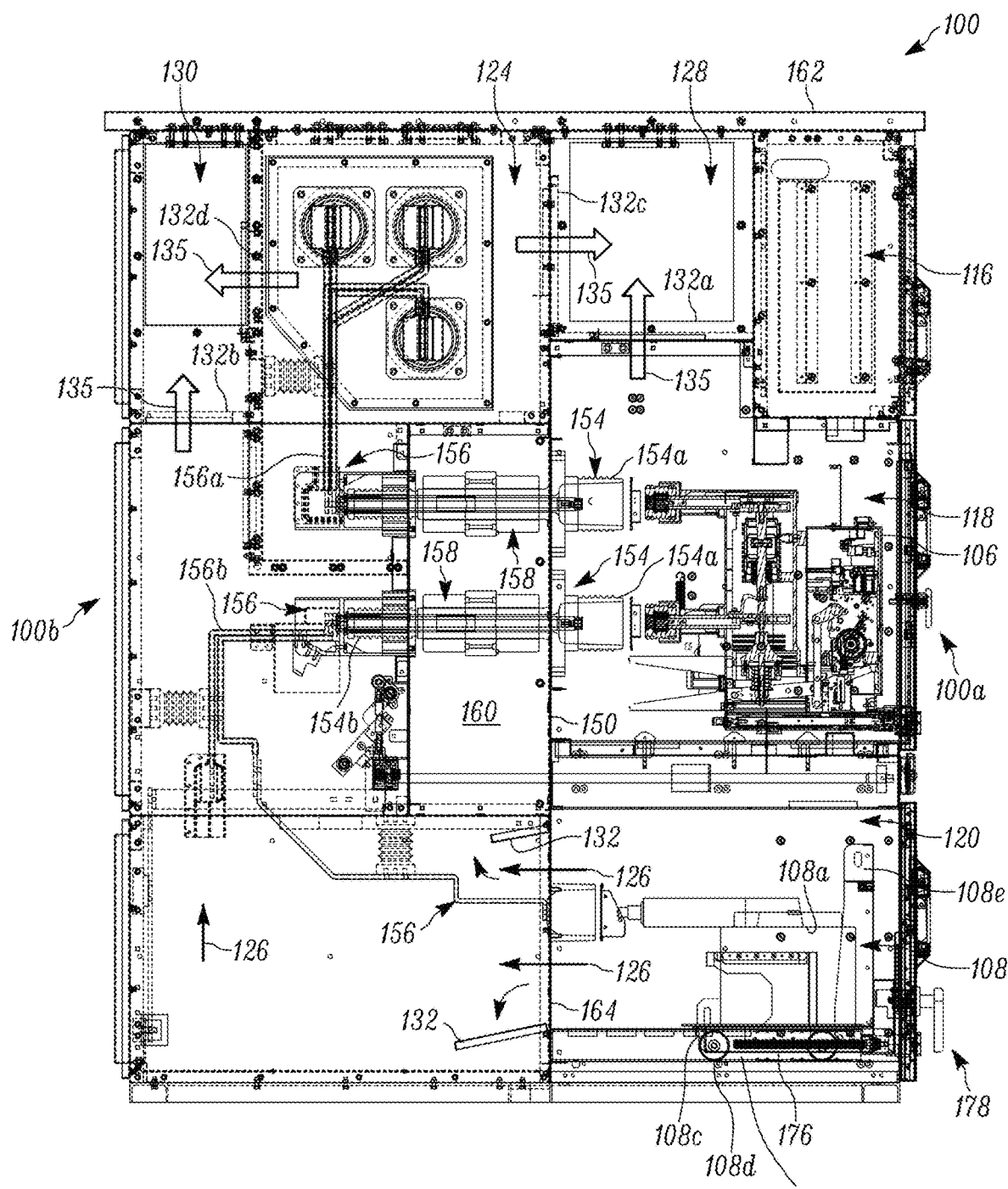

FIG. 3A exemplarily illustrates another side elevation view of the front accessible switchgear enclosure of FIG. 2.

Figure 4:
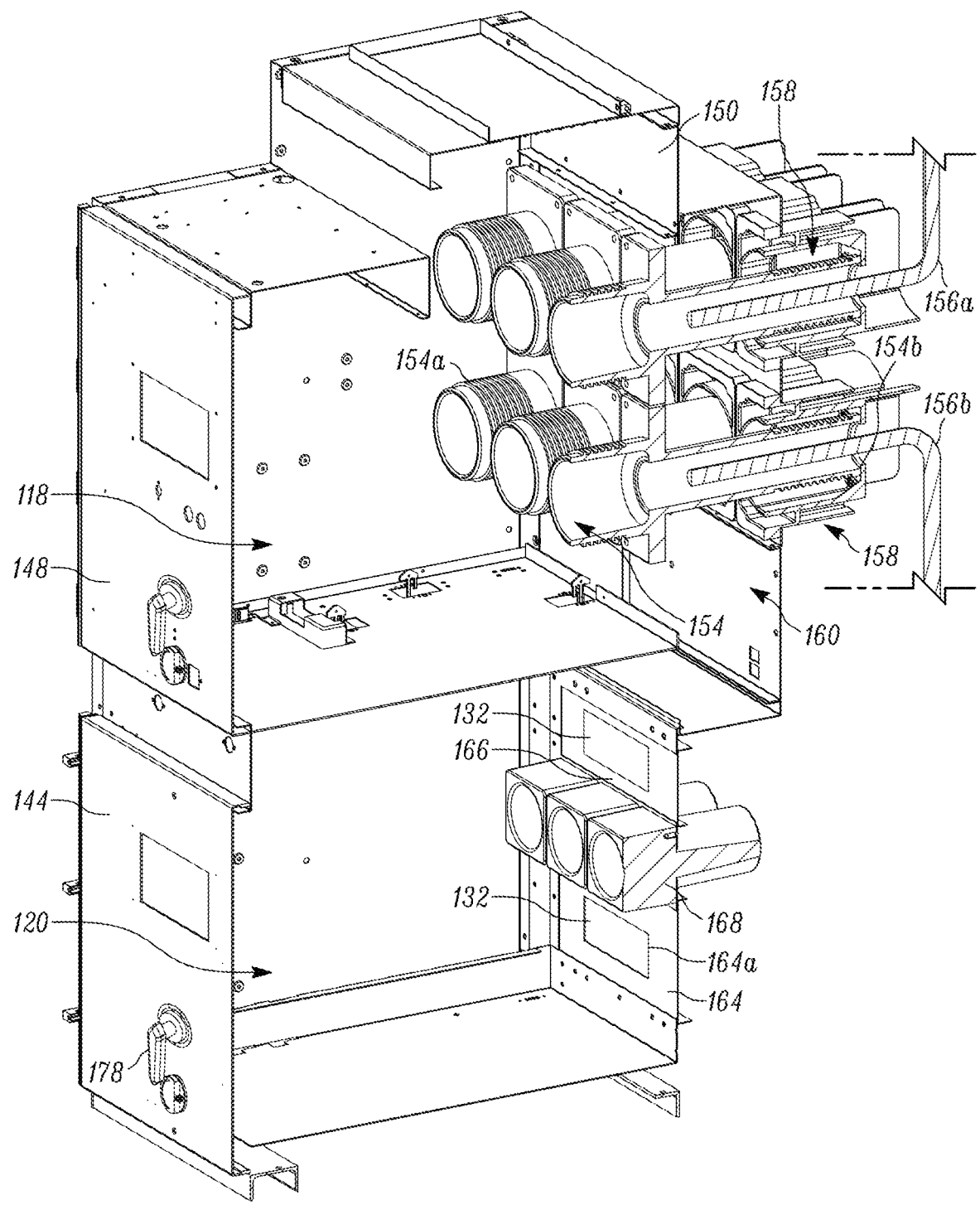

FIG. 4 exemplarily illustrates a partially broken away perspective view of an embodiment of a vacuum circuit breaker compartment and a voltage transformer compartment of the front accessible switchgear enclosure of FIG. 3.

Figure 5:
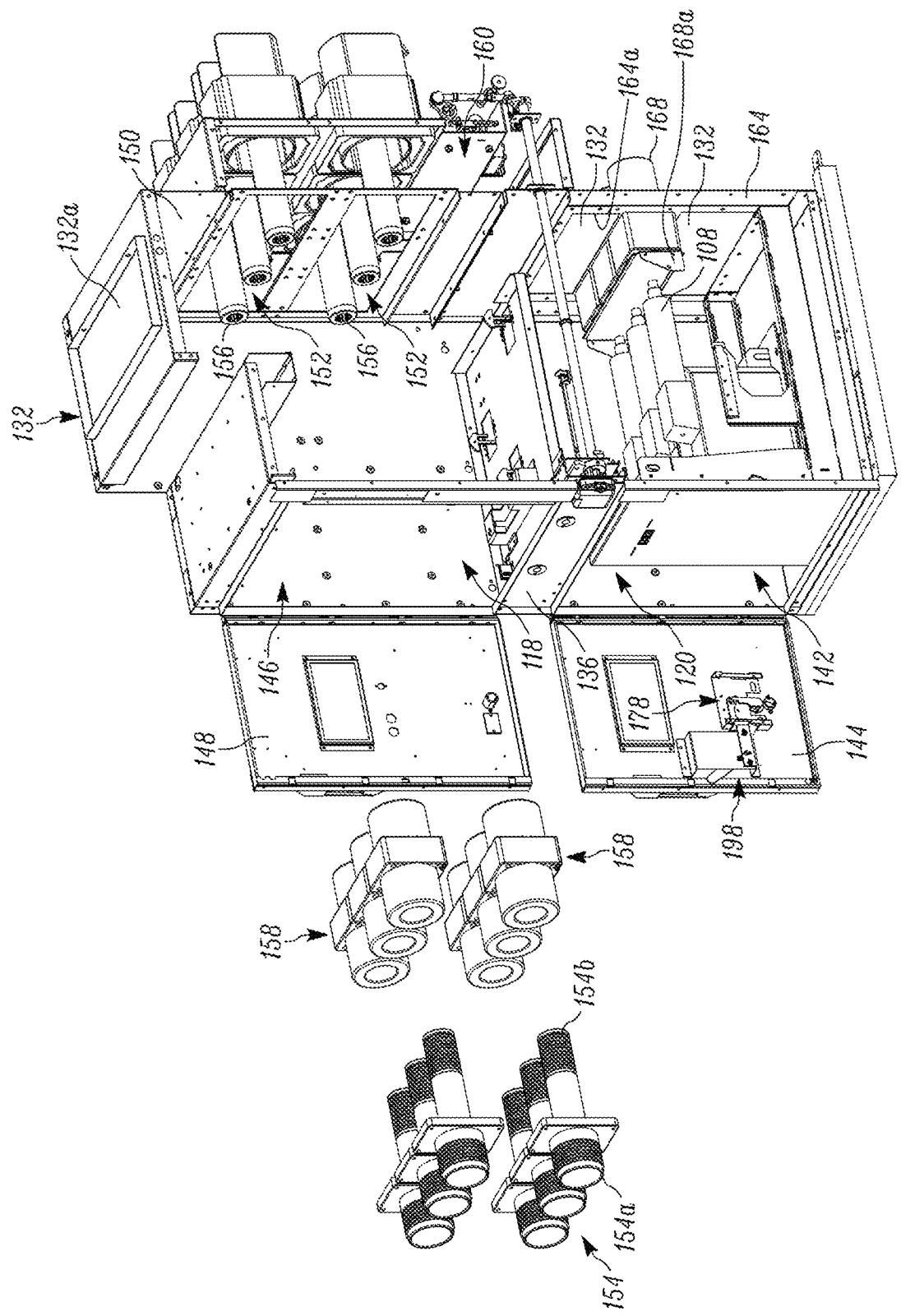

FIG. 5 exemplarily illustrates a partially broken away and exploded perspective view of an embodiment of a vacuum circuit breaker compartment and a voltage transformer compartment of the front accessible switchgear enclosure of FIG. 2.

Figure 6:
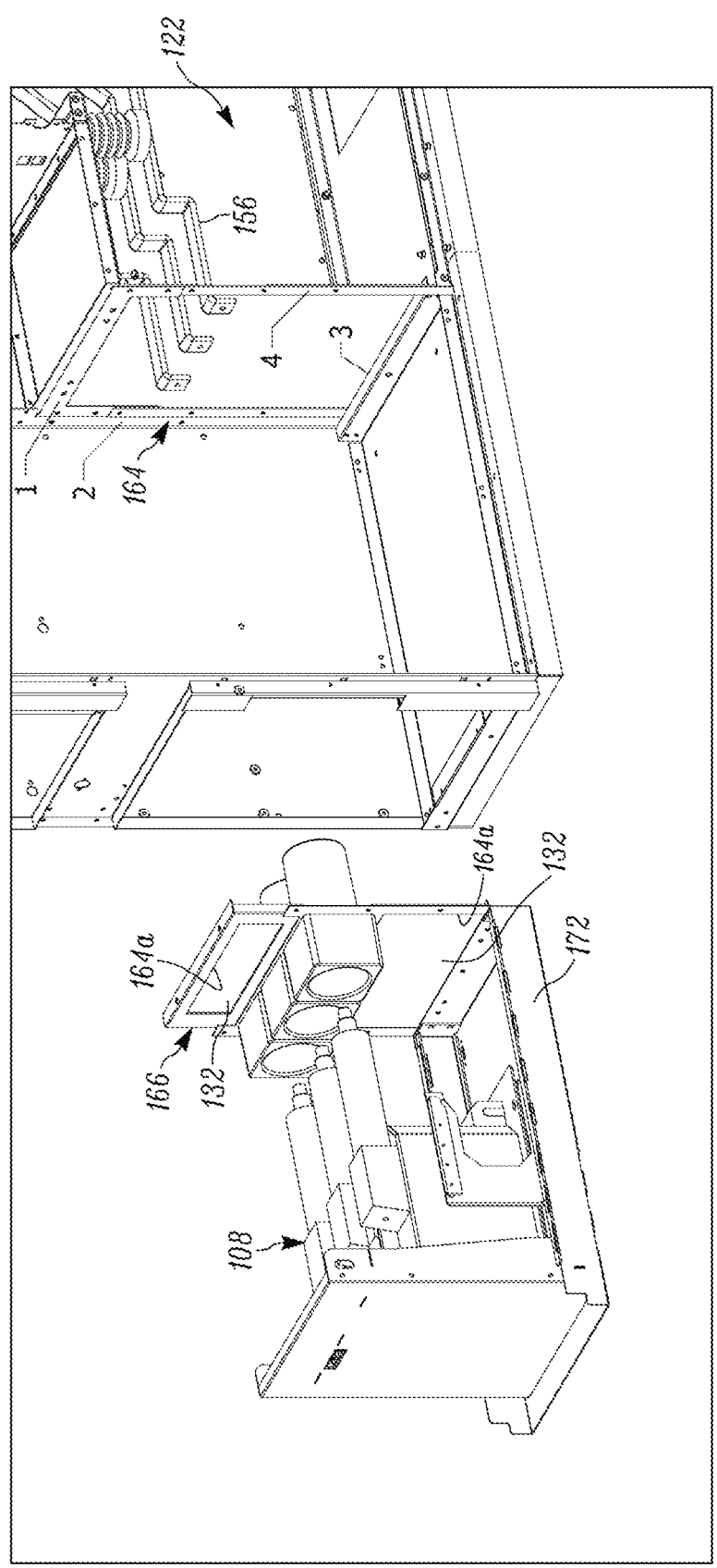

FIG. 6 exemplarily illustrates the partially broken away and exploded perspective view of another embodiment of the voltage transformer compartment of FIG. 5.

Figure 7:
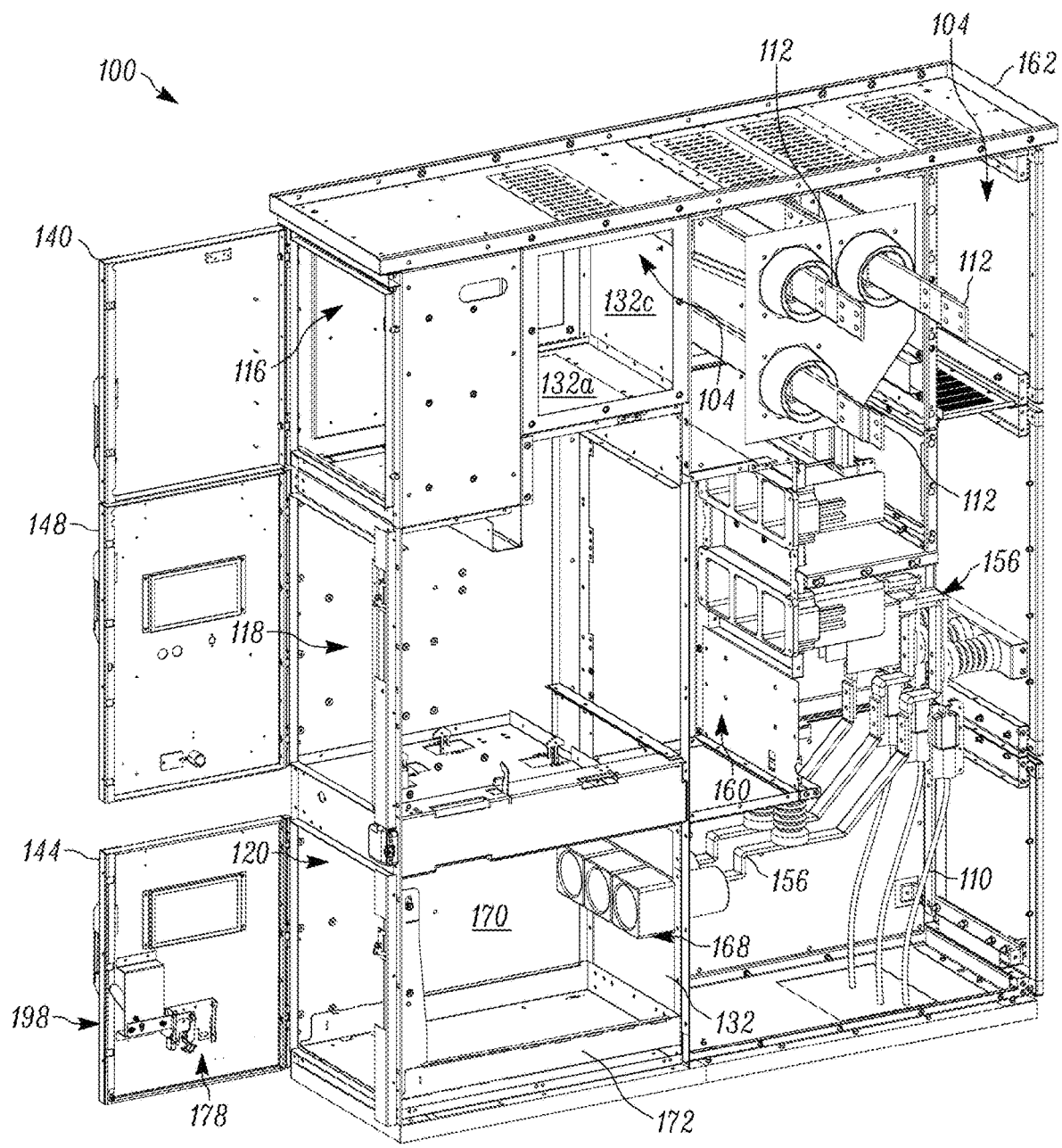

FIG. 7 exemplarily illustrates the partially broken away elevation view of another embodiment of the front accessible switchgear enclosure of FIG. 2 with the main bus bar links added.

Figure 8:
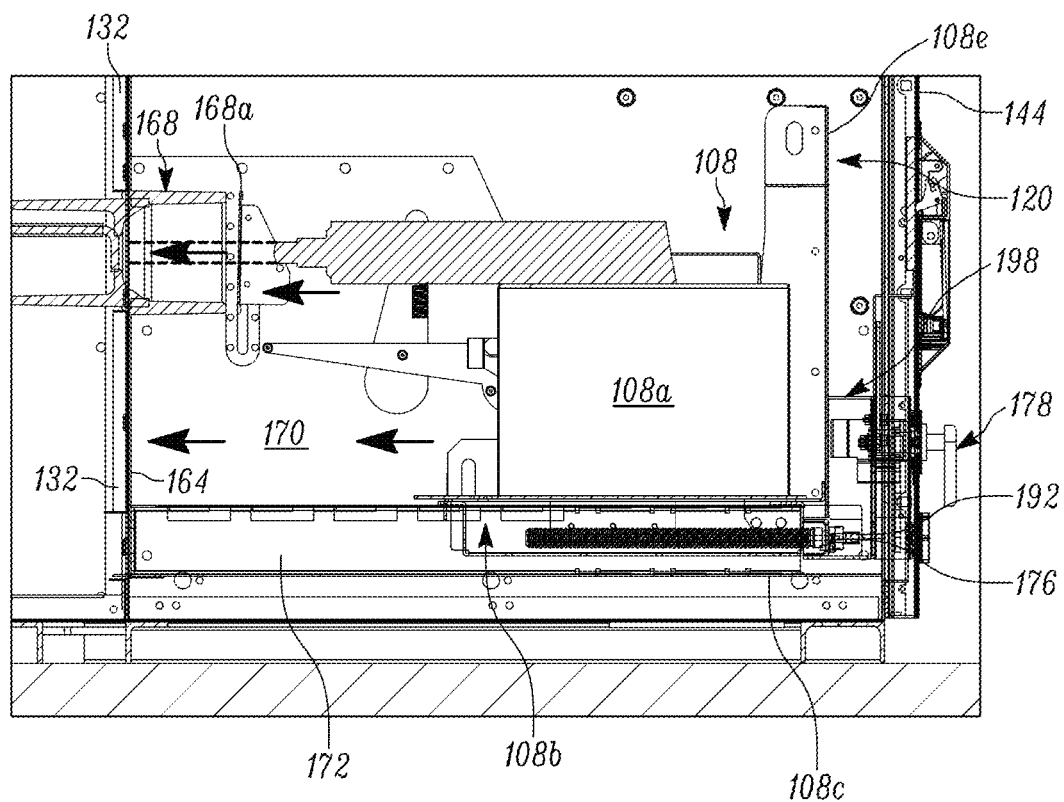

FIG. 8 exemplarily illustrates a detailed elevation view of another embodiment of the voltage transformer compartment of FIGS. 2, 3, 3A and 7.

Figure 9:
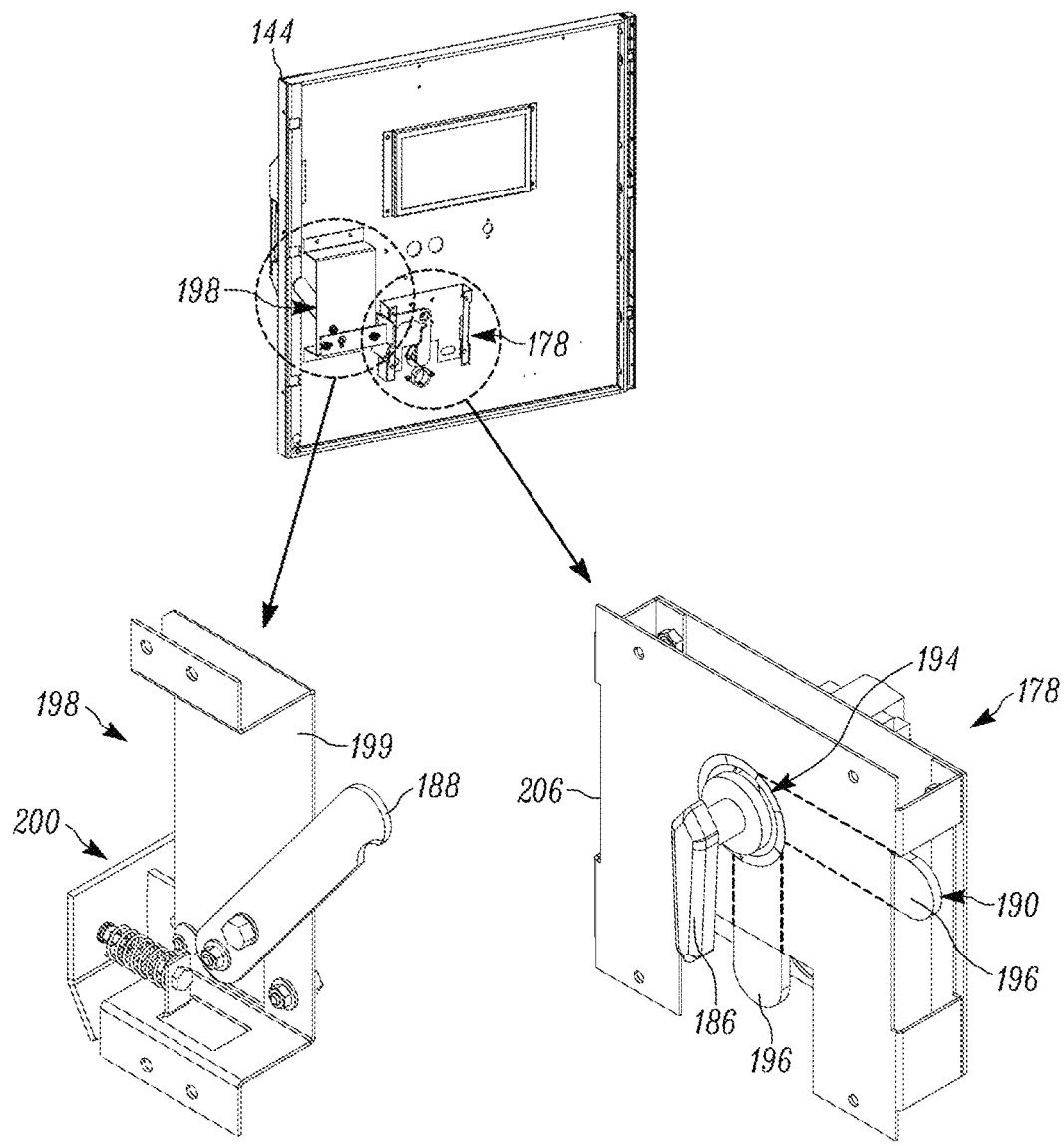

FIG. 9 exemplarily illustrates a partially broken away detail views of the door lock assembly and the door interlock assembly.

Figure 10:
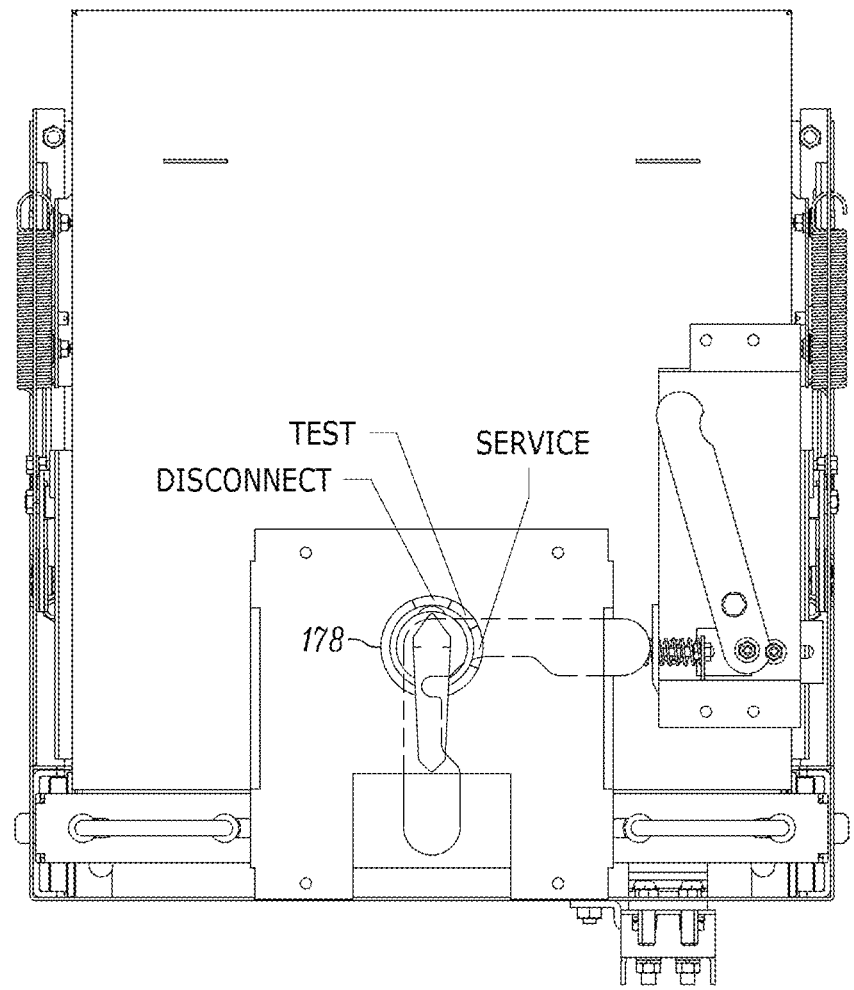

FIG. 10 exemplarily illustrates a partially broken away elevation view of the door lock assembly and the door interlock assembly of FIG. 9 disposed in a disconnected configuration.

Figure 10A:
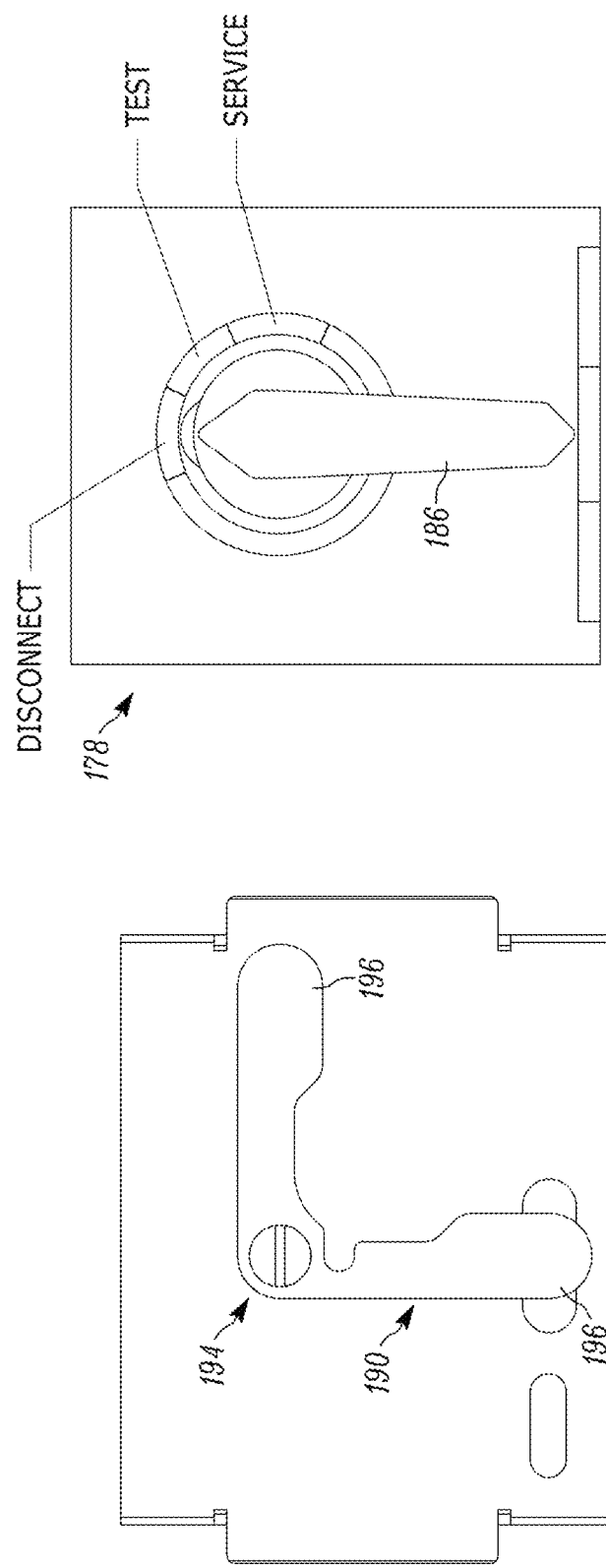

FIG. 10A exemplarily illustrates a detail view of a switch of the door interlock assembly of FIG. 10 disposed in the disconnected configuration.

Figure 11:
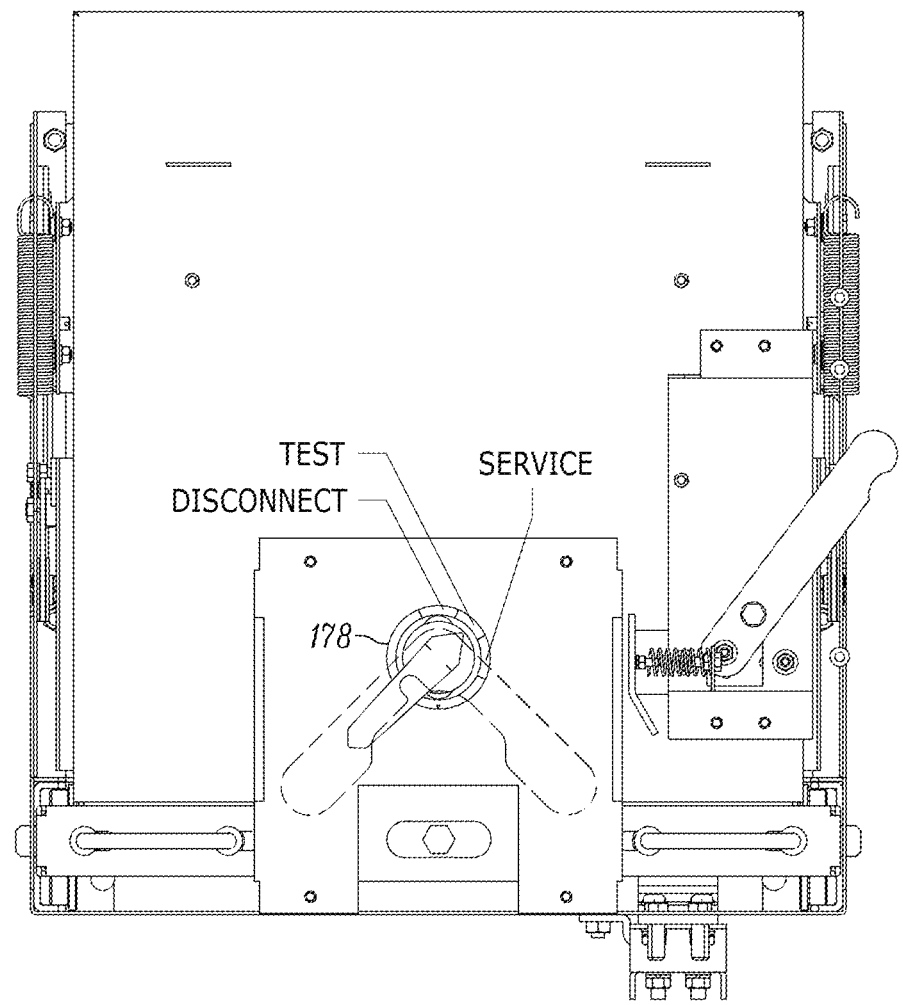

FIG. 11 exemplarily illustrates a partially broken away elevation view of the door interlock assembly of FIG. 9 disposed in a test configuration.

Figure 11A:
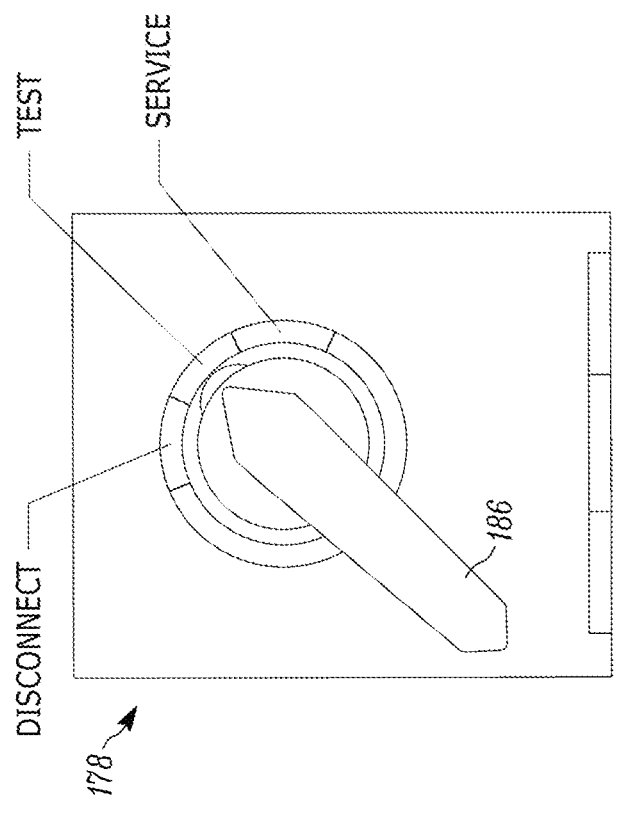
Figure 11A:
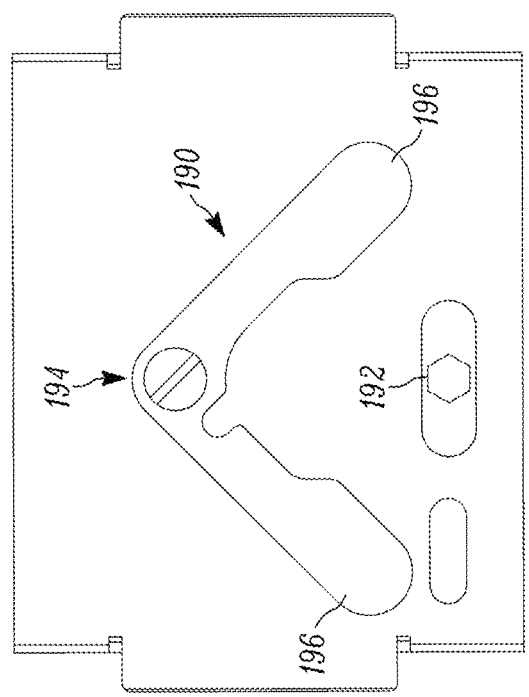

FIG. 11A exemplarily illustrates a detail view of a switch of the door interlock assembly of FIG. 11 disposed in the test configuration.

Figure 12:
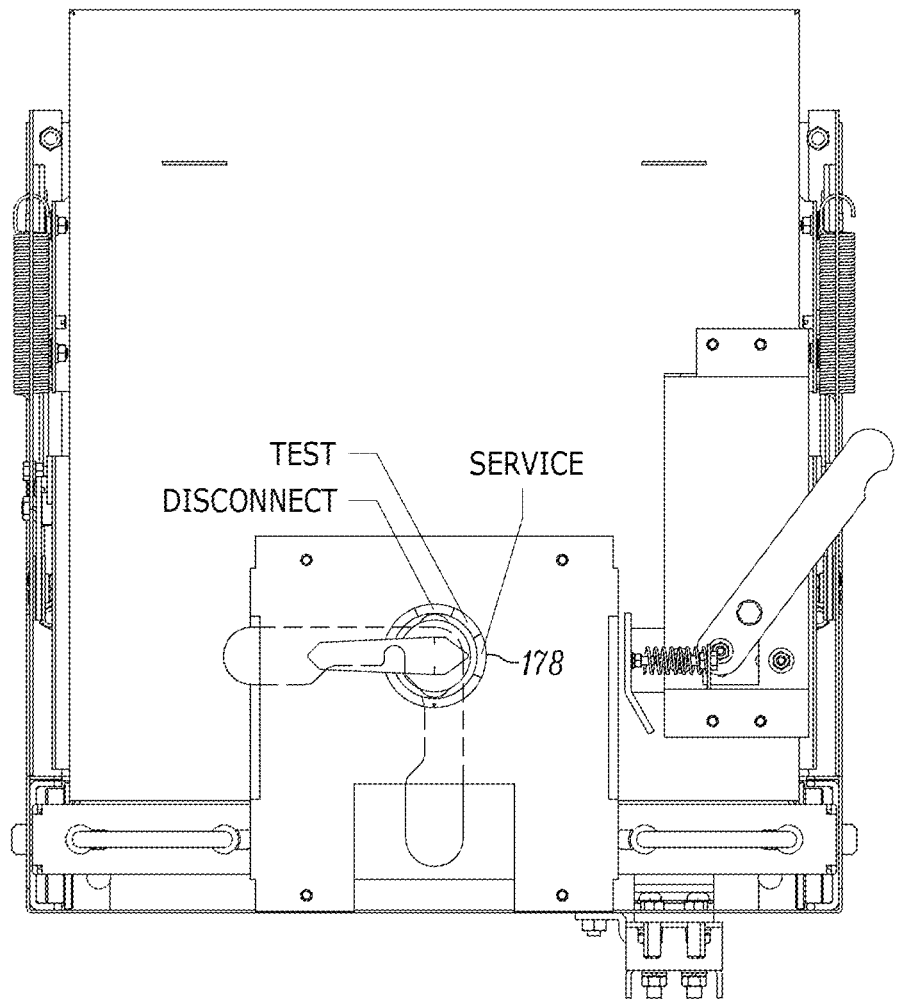

FIG. 12 exemplarily illustrates a partially broken away elevation view of the door interlock assembly of FIG. 9 disposed in a service configuration.

Figure 12A:
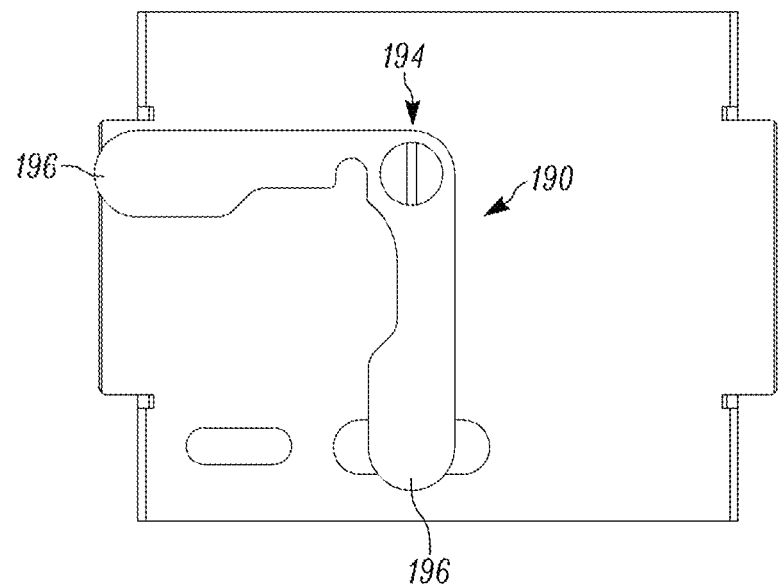
Figure 12A:
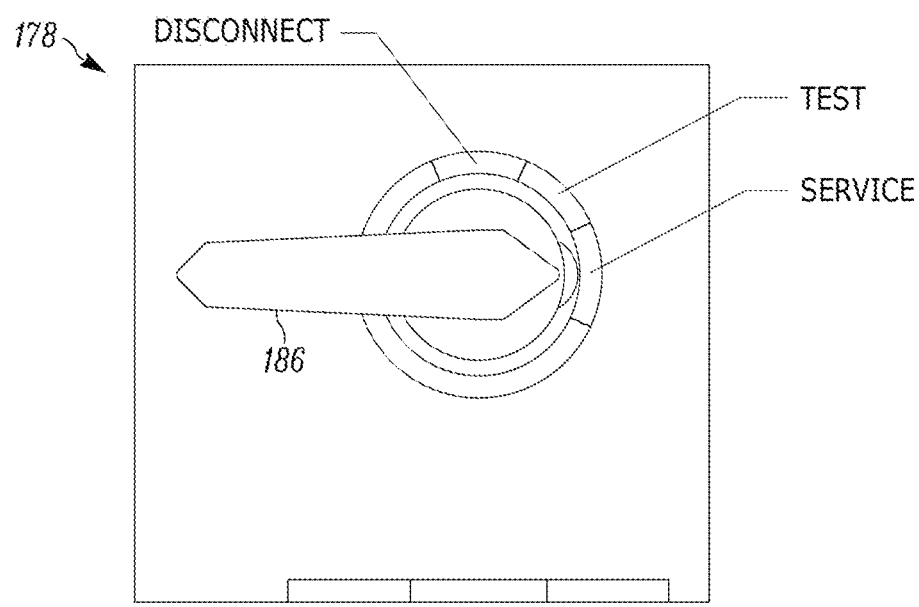

FIG. 12A exemplarily illustrates a detail view of a switch of the door interlock assembly of FIG. 12 disposed in the test configuration.

DETAILED DESCRIPTION OF THE DISCLOSURE

The following disclosure as a whole may be best understood by reference to the provided detailed description when read in conjunction with the accompanying drawings, drawing description, abstract, background, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

FIGS. 1-3 and 3A respectively exemplarily illustrates a perspective view of front accessible switchgear enclosures 100 in accordance with an embodiment of the present disclosure; a side perspective view of one of the pair of front accessible switchgear enclosures 100 of FIG. 1, without side panels for clarity; and side elevation views of the front accessible switchgear enclosure 100 of FIG. 2.

The front accessible switchgear enclosure 100 disclosed herein is an arc resistant electrical enclosure comprising multiple compartments 102 defined within the enclosure 100, plenum chambers 104, electrical components 106, 108, cable connections 110 and bus bars 112, which is accessible only from a front side 100*a* of the enclosure. The front accessible switchgear enclosure 100 disclosed herein is preferably a metal clad switchgear enclosure including metal barriers 114 (e.g., horizontal, vertical, etc.) for separating and compartmentalizing the compartments 102, the electrical components 106, 108, the cable connections 110 and the bus bars 112 from one another in the enclosure 100. It will be recognized that the metal barriers 114 may be configured as the walls of each compartment 102 such that there may be walls that are contiguous over a substantial portion of their respective surfaces or there may be a single wall disposed between the compartments 102 provided that all legal, code and industry requirements are met or satisfied. One of skill in the art will recognize that the metal barriers 114, walls, wall or similar expression for the same functionality, or the like, etc. may be used interchangeably herein without departing from the intent or scope of this disclosure. The front accessible metal clad switchgear enclosure 100 of the present disclosure has a higher safety ceiling and can perform a greater number of operations than conventional switchgear assemblies. For example, the medium voltage switchgear enclosure 100 in accordance with an embodiment of the present disclosure is proven to withstand multiples more arc fault tests than any conventional metal enclosed switch gear assembly.

The compartments 102 are configured to accommodate specific electrical components, for example, a vacuum circuit breaker 106, a potential or voltage transformer 108, cable connections 110, and bus bars 112. One of skill in the art will recognize that the compartments 102 in this disclosure may be formed or configured as separate units that are connected together to form the enclosure 100. Alternatively, the enclosure 100 may be formed or configured with a plurality of separate compartments 102 where each compartment is not necessarily a separately identifiable unit (i.e., adjacent compartments 102 may share a common wall). Further, the cable connections 110 may be commonly referred to and configured as the physical interconnect between the bus bars or spouts or portions thereof and the input or output cables associated therewith.

The size of the front accessible switchgear enclosure 100 disclosed herein is configured to ensure space savings and easy access from the front side 100*a* of the front accessible switchgear assembly 100. The front accessible switchgear enclosure 100 disclosed herein refers to a 15,000 volt (V) switchgear enclosure, but the teaching of which can be equally applicable and extended to higher and lower voltages, accommodates 15 kilovolt (kV) class equipment and provides solutions for 95 kV lightning impulse voltage and 1,200 ampere (A) rating with an electrical component 108, referred to as a potential transformer 108, rated up to 15 kV. The front accessible switchgear enclosure 100 disclosed herein can be extended to higher ratings and can be used for lower medium voltage switchgear assemblies rated 2.5 kV to 15 kV.

In one embodiment, a front accessible switchgear enclosure 100 disclosed herein may include a plurality of discrete functional compartments 102 that are separately or cooperatively defined within the enclosure 100. Each compartment is discrete in the sense that since it is isolated, separate and compartmentalized from adjacent compartments by a metal barrier 114, commonly referred to as walls or a wall, in accordance with legal, code or industry regulations, as applicable, but conventionally known. Preferably, the compartments 102 include a low voltage control compartment 116, a vacuum circuit breaker compartment 118, a voltage transformer compartment 120, a cable connection compartment 122 and a bus bar compartment 124. All compartments 102, 116, 118, 120, 122, and 124 are accessible only from a front side 100*a* of the enclosure 100. In other words, the enclosure 100 does not have any doors, access panels or other ports or passageways on the other sides (i.e., rear side 100*b*, right side 100*c* or left side 100*d*) that would facilitate an operator or user gaining access to the interior or any compartment 102 of the enclosure 100. Such a configuration is advantageous in that the rear side 100*b* of the enclosure 100 may be disposed immediately adjacent an immovable object 300, thereby increasing the density of enclosures 100 that may be disposed within a defined space. Preferably, the low voltage control compartment 116 is entirely isolated from a front plenum chamber 128 and all of the other compartments 102.

In order to maximize floor space and provide the advantages described herein, a rear side 100*b* of the enclosure 100 is disposed immediately adjacent (i.e., at least a minimum distance 100*e* as specified by, for example, approximately four (4) inches or such other dimension as may be specified by legal, code or industry regulations) to an immovable object 300. One of skill in the art will recognize that an immovable object may include a wall (regardless if load bearing or not), a structural support (such as, for example, a beam, post, column, or the like, etc.), a rear wall of another enclosure (where the enclosures are disposed in a back-to-back configuration), or the like, etc. Further, the enclosure 100 as disclosed herein has a width dimension (which is measured across the front side 100*a* of the enclosure from an outer surface of a right side 100*c* to an outer surface of the left side 100*d* when looking at the front side 100*a*) that shall not exceed and is no greater than twenty-four inches. Again, such a configuration is advantageous in that the density of enclosures 100 within a defined space can be maximized.

An exit path 126 for releasing pressure, gases and particulate matter generated by electrical component 108 accommodated in the compartments 102 within the enclosure 100 during an arc flash event is advantageous. The enclosure 100 may also include or define (via various walls of the enclosure 100) a front plenum chamber 128 and a rear plenum chamber 130 to facilitate release of arc fault event pressure, gases and particulate matter from the enclosure 100. The exit path 126 is provided or defined via various walls of the enclosure 100 and by flaps 132 associated with openings formed in the walls associated with the plenums 128, 130 (and the voltage transformer compartment 120 and cable connection compartment 122 interface) and passageways defined by open areas of the compartments 102 as described herein, when the flaps 132 are moved from a normally closed position (as shown in FIG. 3) to an operatively open position (as shown in FIGS. 2 and 3A), as is conventionally understood by one of skill in the art (i.e. usually either some form of pivotal movement or disconnection in some manner), in order to uncover or reveal the openings in the walls. One of skill in the art will recognize that the front and rear plenum chambers 128, 130 facilitate extraction of the pressure, gases and particulate matter to a location external to the enclosure 100, as is commonly understood. Flaps 132 associated with openings 164a in the wall 164, portion or front wall of cable connection compartment, facilitate isolation of the voltage transformer compartment 120 from the cable connection compartment 122 when closed. During an arc fault event, the flaps 132 associated with wall 164 open to define the exit path 126 from the voltage transformer compartment 120 through the cable connection compartment 122 into the rear plenum chamber 130 through flap 132b.

The front plenum chamber 128 is disposed between the low voltage control compartment 116 and the bus bar compartment 124 and is adjacent to and in operative communication with the vacuum circuit breaker compartment 118, and the bus bar compartment 124. The rear plenum chamber 130 is disposed adjacent to and in operative communication with the cable connection compartment 122 and the bus bar compartment 124. The flaps 132 between the compartments 102 and the front and rear plenum chambers 128, 130 prevent the gases and particulate matter from entering the other compartments 102 via the front or rear plenum chambers 128, 130 when the flaps 132 are disposed in a normally closed position. In other words, a direct arc flash vent path 135 is defined between the vacuum circuit breaker compartment 118 and a front plenum chamber 128 thorough flap 132a, when flap 132a is disposed in an open position that reveals or uncovers the opening in the wall between the vacuum circuit breaker compartment 118 and a front plenum chamber 128. A direct arc flash vent path 135 is also defined between the cable connection compartment 122 and a rear plenum chamber 130 through flap 132b, when flap 132b is disposed in an open position that reveals or uncovers the opening in the wall between the cable connection compartment 122 and a rear plenum chamber 130. Furthermore, a direct arc flash vent path 135 is also defined between the bus bar compartment 124 and the front or rear plenum chambers 128, 130 through flaps 132c, 132d, when the respective flap 132c or 132d is disposed in an open position that reveals or uncovers the opening in the wall between bus bar compartment 124 and the front or rear plenum chambers 128, 130. One of skill in the art will recognize that the flaps 132 function in the same manner as a one-way valve, diode or structure with similar functionality.

The low voltage control compartment 116 and the bus bar compartment 124 each include a plurality of walls, including a top wall, that define, enclose and isolate such compartments from one another and the other compartments. Preferably, the top walls of each of the foregoing compartments and the upper portions of the front and rear plenum chambers 128, 130 are substantially co-planar such that and to facilitate a separate roof panel 162 to be removably connected to the enclosure 100, so that the roof panel 162 is contiguous with the top wall of the low voltage control compartment 116 and the bus bar compartment 124. Removal of the roof panel 162 permits selective front accessibility to the bus bar compartment 124 through the front plenum chamber 128 and a flap 132c movably connected to a front wall of the bus bar compartment 124. One of skill in the art will recognize that the flaps 132 are preferably connected to a respective compartment wall by a hinge, or similar mechanism that facilitates pivotal movement, on one side and a releasable connector on an opposite side or a plurality of releasable connectors that facilitate removal or disconnection. When the pressure or temperature exceeds a desired threshold, the releasable connector disengages, disconnects or releases and the flap is free to pivot about the hinge or entirely disconnect. Thereby revealing an opening in the wall or walls as discussed above, and completing, defining and facilitating the exit path 126 and the direct arc flash vent path 135.

In order to access the bus bar compartment 124 after the roof panel 162 is removed, the flap 132c can be grasped on the side with the releasable connector and moved with sufficient force to release the releasable connector and pivot the flap 132c about its hinge, or similar mechanism or to remove the flap 132c. In other words, a method of accessing the bus bar compartment 124 of a front accessible switchgear enclosure 100 may include removing the roof panel 162; accessing the front plenum chamber 128 from the front side 100a of the enclosure 100; moving the flap 132c connected to a front wall of the bus bar compartment 124 from a normally closed position to an open position to reveal an opening in the wall between the bus bar compartment 124 and the front plenum chamber 128; and accessing the bus bar compartment 124 through the front plenum chamber 128 and the opening revealed by the flap 132c from the front 100a of the enclosure 100.

The enclosure 100 has a front wall 136 that serves as a front surface to which compartment 102 doors are attached or operatively cooperate with to cover openings therein that facilitate access to such compartments 102. In particular, an opening 138 is defined in the front wall 136 in registration with the low voltage control compartment 116, which includes and is defined by a plurality of walls, and a door 140 movably connected to the enclosure 100 covers the opening 138 when disposed in a closed position. Likewise, an opening 142 is defined in the front wall 136 in registration with the voltage transformer compartment 120, which includes and is defined by a plurality of walls, and a door 144 movably connected to the enclosure 100 covers the opening 142 when disposed in a closed position. Furthermore, an opening 146 is defined in the front wall 136 in registration with the vacuum circuit breaker compartment 118, which includes and is defined by a plurality of walls, and a door 148 movably connected to the enclosure 100 covers the opening 146 when disposed in a closed position.

In one embodiment, the voltage transformer 108 is disposed within the voltage transformer compartment 120 that is disposed behind a lower door 144 that covers the opening 142 in the front wall 136, and the vacuum circuit breaker component 106 is disposed within the vacuum circuit breaker compartment 118 that is disposed behind a middle door 148 that covers the opening 146 in the front wall 136.

The vacuum circuit breaker compartment 118 as further shown in FIGS. 4 and 5, includes a rear wall 150 having an opening 152 defined therein such that the vacuum circuit breaker compartment 118 is in communication with the bus bar compartment 124. The vacuum circuit breaker compartment 118 also includes a plurality of individually removable insulator bushings 154 selectively connected in a conventional manner to the rear wall 150 to cooperatively cover the opening 152 such that the bushings 154 include a front portion 154a that extends from the rear wall 150 into the vacuum circuit breaker compartment 118 and a rear portion 154b that extends from the rear wall 150 into the bus bar compartment 124.

The bus bar compartment 124 includes a plurality bus spouts 156 that each extend through one of the bushings 154 in the direction of the vacuum circuit breaker compartment 118. A plurality of individually removable current transformers 158 are selectively disposed in the bus bar compartment 118, such that the rear portion 154b of each bushing 154 extends through one of the current transformers 158. Each individual current transformer 158 is separately mounted, connected or coupled to complimentary mounts to appropriate conventional structure disposed in the bus bar compartment 124 (or the sub-compartment as described herein) and are accessible and removable from a front 100a of the enclosure 100 by removal of the respective bushing 154 from the rear wall 150 of the vacuum circuit breaker compartment 118 and subsequent individual access through the opening 152 from the front side 100a of the enclosure 100.

In order to provide the advantages described herein, the bus bar compartment 124 includes a sub-compartment 160 defined by a plurality of walls, including a rear wall, such that the current transformers 158 are disposed within the sub-compartment 160 of the bus bar compartment 124 (as described herein). The plurality of bus spouts 156 may include a plurality of forward bus spouts 156a and a plurality of return bus spouts 156b such that there is a pair of bus spouts 156 for each phase of electrical power.

In one embodiment, each of the low voltage control compartment 116, the vacuum circuit breaker compartment 118, and the voltage transformer compartment 120 include a plurality of walls, including a front wall 136 that are all co-planar so as to provide a substantially vertical and smooth front side 100a of the enclosure 100. A lower door 144 is movably connected to the front wall of the voltage transformer compartment 120, a middle door 148 is movably connected to the front wall of the vacuum circuit breaker compartment 118, and an upper door 140 is movably connected to the front wall of the low voltage control compartment 116. The bus bar compartment 124 is disposed above the cable connection compartment 122 and rearwardly of the front plenum chamber 128. The cable connection compartment 122 is disposed rearwardly of the voltage transformer compartment 120. A direct arc flash vent path 135 is defined between the vacuum circuit breaker compartment 118 and a front plenum chamber 128, between the cable connection compartment 122 and a rear plenum chamber 130 and between the bus bar compartment 124 and the front and rear plenum chamber 128 and 130.

FIG. 4 exemplarily illustrates a partially broken away perspective view of an embodiment of a vacuum circuit breaker compartment 118 and the voltage transformer compartment 120 with the voltage transformer truck 108 removed out of the front accessible switchgear enclosure 100 of FIG. 3 and other details removed for clarity.

FIG. 5 exemplarily illustrates a partially broken away and exploded perspective view of an embodiment of a voltage transformer compartment 120 of the front accessible switchgear enclosure 100 of FIG. 2. As disclosed herein, the front accessible switchgear enclosure 100 includes a plurality of discrete functional compartments 102 defined within the enclosure 100. The compartments 102 may include a voltage transformer compartment 120 and a cable connection compartment 122, where both compartments are disposed in a bottom location of the enclosure 100 and the cable connection compartment 122 is disposed rearwardly of the voltage transformer compartment 120. A front wall 136 includes a lower opening 142 in registration with the voltage transformer compartment 120 and a door 144 that is movable between an open position that provides access to the voltage transformer compartment 120 and a closed position that prevent access to the voltage transformer compartment 120. Each of the compartments 120, 122 includes a respective plurality of walls, including, in one embodiment, a front wall and a rear wall, wherein the front wall of the cable connection compartment 122 is contiguous with the rear wall of the voltage transformer compartment 120. It is within the teachings of the present disclosure and will be recognized that when the front wall of the cable connection compartment 122 and the rear wall of the voltage transformer compartment 120 are contiguous, such configuration represents or constitutes, and may commonly be referred to, without detracting from the scope of this disclosure, as a wall 164 between the voltage transformer compartment 120 and the cable connection compartment 122 (and shall be construed to consider and cover two walls that are contiguous or a single wall with appropriate accommodations for either configuration). Further, one of skill in the art will recognize that a single wall between the compartments 120, 122 (e.g., only the front wall of the cable connection compartment 122, only the rear wall of the voltage transformer compartment 120, or an independent wall between the compartments 120, 122) will be functionally equivalent and referred to as the wall 164 provided that such configuration meets all applicable code, legal, or industry regulations.

FIG. 6 exemplarily illustrates the partially broken away and exploded perspective view of another embodiment of the voltage transformer compartment of FIG. 5. FIG. 7 exemplarily illustrates an elevation view of another embodiment of the voltage transformer compartment of FIG. 6, with the voltage transformer removed from the tracks of 172. FIG. 8 exemplarily illustrates a detailed elevation view of another embodiment of the voltage transformer compartment of FIGS. 2, 3, 3A and 7.

In one embodiment, the front wall of the cable connection compartment 122 includes an opening and a portion 166 of the rear wall of the voltage transformer compartment 120 is removably connected to the rear wall of the voltage transformer compartment 120 to facilitate access to the cable connection compartment 122 from a front side 100a of the enclosure 100. In another embodiment, a portion 166 of the wall 164 between the voltage transformer compartment 120 and the cable connection compartment 122 is removably connected to facilitate access to the cable connection compartment 122 from a front side 100a of the enclosure 100. Preferably, the opening in the front wall of the cable connection compartment 122 or the wall 164 is aligned in registration with the portion 166, such that when the portion 166 is removed the opening is revealed, uncovered or defined (see FIG. 6). The portion 166 of the rear wall or the wall 164 includes an insulator bushing 168 fixed thereto to facilitate connection between a voltage transformer 108 disposed in the voltage transformer compartment 120 and bus spouts 156 disposed in the cable connection compartment 122. The portion 166 may further include an inner sidewall and tracks 172 that extend toward a front side 100a of the enclosure 100. The inner sidewall 170 may include a selectively operable element 174 that is engaged by the voltage transformer 108 when being racked-in such that the shutter 168a is moved to facilitate engagement and electrical coupling of the voltage transformer 108 and the bus spouts 156 as is conventionally understood by one of skill in the art. It is within the teachings of the present disclosure that the operable element 174 may be configured as a latch, catch, lever, etc., or similar type or kind of selectively engageable apparatus or device.

In one embodiment, the voltage transformer 108 includes, as a combination, an operative, functional electrical component 108a and a truck 108b. The component 108a is movably connected to the truck 108b to facilitate racking of the component 108a in and out, as will be commonly understood by one of skill in the art. The truck 108b includes a base 108c, wheels 108d connected to the base 108c, a front wall 108e. The base 108c and wheels 108d may define what is commonly referred to as a trolley. The base has a screw-type jack assembly centrally connected to the base and operated by an interface known as a racking tool (not shown, but conventionally known). When the truck is rolled into the compartment and the wheels are connected to the tracks on either side, the truck is latched into position by sliding in the spring loaded handles on either side of the trolley base. The voltage transformer and the wheels within the truck move in or out along the screw jack when it is selectively racked clockwise or counter or anticlockwise by the tool. It is within the teachings of the present that the trolley may have any desired configuration so as to provide the intended functionality. For example, the wheels 108d preferably interface with the tracks 172 so as to guide the trolley into its secured position within the voltage transformer compartment 120 and to provide rolling functionality to move the voltage transformer 108 when disposed outside the voltage transformer compartment 120. In one embodiment, the trolley is moved into an installed position when loaded from outside the voltage transformer compartment 120 onto the tracks 172 then moved rearwardly until reaching stops on the tracks 172 or engaging a latch mechanism that secures the trolley in a fixed position (see FIGS. 2, 3 and 3A). The position of the trolley matches with the position of the switch checked through the interlock assembly 178, mounted on the inner side of the door 144. The front wall 108e is disposed at a leading, forward, outward edge of the truck adjacent the door 144 and serves as an additional shielding panel in the event of an arc fault event. The racking mechanism 176 is connected to the truck 108b and has an interface device (commonly understood by those of skill in the art and may be configured to have a hex or other advantageously shaped end to facilitate actuation by conventional tools) disposed at its leading, forward, outward end adjacent the door 144 and disposed in aligned registration with an opening in the door to facilitate the racking or drawing in and out of the component 108a. The component 108a is, directly or indirectly, movably connected to the truck 108b and the racking mechanism 176 (which may be configured as a screw or any other structure that provides for intended functionality) so that when the racking mechanism 176 may be actuable or actuated (i.e., unblocked by the lock plate 190), actuation thereof (by rotation in the proper direction if a screw) moves the component 108a with respect to the truck 108b in a rearward direction away from the door 144 and into contact with the bus spouts 156 (see FIG. 7).

A method of accessing the cable connection compartment 122 of a front accessible switchgear enclosure 100 as disclosed herein may include removing a portion 166 of the wall 164 between the voltage transformer compartment 120 and the cable connection compartment 122 or the portion 166 of the rear wall of the voltage transformer compartment 120 that is aligned in registration with the opening in the front wall of the cable connection compartment 122 and accessing the cable connection compartment 122 through the voltage transformer compartment 120 and the opening from the front side 100a of the enclosure 100.

FIGS. 9-12, 10A, 11A and 12A exemplarily illustrates selected highlighted views of another embodiment of the voltage transformer compartment 120 of FIGS. 2, 3, 3A, 5, 7, and 8 including an interlock assembly 178 and a lock assembly 198. This embodiment of the front accessible switchgear enclosure 100 includes a plurality of discrete functional compartments 102 defined within the enclosure 100 that are accessible only from a front side 100a of the enclosure 100, like all of the other embodiments of this disclosure. The compartments 102 include, among others, a voltage transformer compartment 120 that includes a plurality of walls, including a front wall 136 which has an opening 142 and a door 144 connected thereto that is movable between an open position to expose the opening 142 and a closed position to cover the opening 142. A voltage transformer 108 disposed within the voltage transformer compartment 120 includes a racking mechanism 176 for moving the voltage transformer 108 between a racked or drawn-in position (see FIGS. 2, 3 and 3A), and a racked or drawn-out position (see FIG. 8). Preferably, the racking mechanism 176 includes an interface device 192 that facilitates engagement of the racking mechanism 176 by a conventional tool or device so that the operator or user and manipulate the racking mechanism 176 as disclosed herein. As will be recognized by one of skill in the art that the racking mechanism 176 and the operation thereof in this present disclosure is substantially in a conventional manner and accordingly will not be described in detail, since it is understood that one of skill in the art will have basic knowledge thereof.

The door 144 may further include an interlock assembly 178 that selectively actuates the lock assembly 198 and facilitates selective actuation of the racking mechanism 176 and movement of the door 144 from the closed position such that when the interlock assembly 178 is disposed in one of a test configuration (see FIG. 10A) and a service configuration (see FIG. 11A) the door 144 is secured in the closed position and when the interlock assembly 178 is disposed in one of a disconnected configuration (see FIG. 10A) and the service configuration (see FIG. 12A) the racking mechanism is non-actuable.

The interlock assembly 178 is preferably connected to the door 144 and may include a switch handle 186 with a shaft connected to the switch mechanism and supported by the front wall 108e disposed adjacent the rear side of the door 144 or on the voltage transformer which functions as a shield for advantageous safety reasons in an arc fault event, understood by one of skill in the art. The interlock assembly 178 is preferably connected to the door 144 and may include a shielding plate 206, a switch handle 186 connected to the switch that is secured to a backplate, a shaft that connects the handle 186 to the switch and a lock plate 190. Preferably, the lock plate 190 is contiguously engaged so as to move in aligned registration with the switch handle 186. In various embodiments, the lock plate 190 may be connected to the switch handle 186, may be connected to the shaft, or may have any other suitable direct or indirect connection or operative association with the switch handle 186 in order to provide the intended functionality related to contiguous engagement. The lock plate 190 may include a vertex 194 that facilitates the contiguous engagement with the switch handle 186 by direct keyed physical connection and from which a pair of arms 196 extend, disposed normal with respect to one another or other suitable angle as desired. In one embodiment, the lock plate 190 and the switch may be connected to a common shaft and adjacently disposed. Preferable, the switch handle 186 and the lock plate 190 are either directly or indirectly connected, coupled or maintained in aligned registration in order to facilitate the functionality described herein. The shielding plate 206 provides important functionality with respect to increasing operator safety in the event of an arc fault event. The door 144 has an opening for the switch handle 186 to extend though so that an operator may actuate the switch handle 186, as described herein, and an opening for a racking tool to extend through in order to engage the interface device 192 of the racking mechanism 176 in order rack-in or rack-out the voltage transformer 108. The shielding plate 206 provides protection against the gases, pressure and particulate matter exiting the front of the voltage transformer compartment 120 through either of the openings during or as a result of an arc flash incident. The shielding plate 206 also acts as a barrier that shields the voltage transformer and controls from external damages when the door is open for drawing out the voltage transformer truck.

The lock assembly 198 may include a mounting plate 199, the lock link 188, an actuation link 200, and a biasing element 202. The mounting plate 199 is connected to the door and provides structure to facilitate the installation and operation of the lock assembly 198. The lock link 188 may be pivotally connected to the door 144 (or, preferably, to the mounting plate 199 so as to be disposed between the door and the mounting plate 199) and movably connected to the actuation link 200 (which connection may be characterized as pivotally in certain embodiments, but not all; for example, movement may be linear in a direction lateral to the lock link if so configured). When the lock plate 190 selectively engages the actuation link 200 (by actuation movement of the switch handle 186), the actuation link 200 is moved from a first position (see FIGS. 11 and 12) where the biasing element 202 is extended and the lock link 188 is disposed in a secure position, which fixes the door 144 in a closed position to a second position (see FIG. 10) where the biasing element 202 is compressed and the lock link 188 is disposed in an unsecure position so that the door 144 freely moves between the open and closed positions. Likewise, when the lock plate 190 is selectively disengaged from the actuation link 200 (by actuation movement of the switch handle 186), the actuation link 200 is moved from the second position (i.e., where the lock link 188 is in the unsecure position) to the first position (i.e., where the lock link 188 is in the secure position). One of skill in the art will recognize that the actuation link 200 and lock link 188 are normally disposed in the secure position as a result of the biasing element 202. In one embodiment, the secure position may be defined by the door 144 disposed in a closed position and the lock link 188 pivoted to have a portion that extends to a perimeter of the door 144 so that such portion may engage a slot in the frame of the enclosure, may be disposed behind a frame member of the enclosure, or engages or is otherwise disposed such that interference with a part of the enclosure absolutely prevents moving the door 144 from the closed position to an open position or fixes the door 144 in the closed position. The unsecure position may be defined by the lock link 188 disposed so that such portion is disposed within the perimeter of the door 144, such that there is no impediment to the door moving freely between open and closed positions.

The door 144 may include a latch for releasably connecting the door 144 to the front wall 136, a handle 182 movably connected to the door 144, when actuated, engages the latch to disconnect the door 144 from the front wall 136.

When the interlock assembly 178 is disposed in one of a test configuration (see FIG. 11A) and a service configuration (see FIG. 12A) the lock link 188 is disposed in a secure position and when the interlock assembly 178 is disposed in one of a disconnected configuration (see FIG. 10A) and the service configuration (see FIG. 12A) the racking mechanism 176 is non-actuable.

The disconnected configuration (see FIGS. 10 and 10A) is defined by the lock link 188 disposed in the unsecure position to facilitate free movement of the door 144 between the open and closed positions, and the interface device 192 blocked by the lock plate 190 disposed in aligned registration therewith. This configuration is further defined by the switch handle 186 disposed in a substantially vertical alignment, wherein a longitudinal axis of the backbone or spine of the switch handle 186 is substantially vertically oriented (see FIG. 10A).

The service configuration (see FIGS. 11 and 11A) is defined by the lock link 188 disposed in the secure position to fix the door 144 in the closed position, and the interface device 192 blocked by the lock plate 190 disposed in aligned registration therewith. This configuration is further defined by the switch handle 186 disposed in a substantially horizontal alignment, wherein the longitudinal axis of the backbone or spine of the switch handle 186 is substantially horizontally oriented (see FIG. 11A).

The test configuration (see FIGS. 12 and 12A) is defined by the lock link 188 disposed in the secure position to fix the door 144 in the closed position, and the interface device 192 unblocked by the lock plate 190 disposed unaligned therewith. This configuration is further defined by the switch handle 186 disposed in a desired alignment between the substantially vertical alignment of the disconnected configuration and the substantially horizontal alignment of the service configuration (see FIG. 12A).

In view of the foregoing, the interlock assembly 178 of the present disclosure provides advantages over the prior art with respect to strict control over the movement (i.e., opening or closing) of the door 108 and the racking (i.e., in or out) of the voltage transformer 108.

A method for installing a voltage transformer 108 into a voltage transformer compartment 120 within a front accessible switchgear enclosure 100 that is accessible only from a front side 100a of the enclosure 100, where the voltage transformer compartment 120 includes a plurality of walls, including a front wall 136 that has an opening 142 and a door 144 connected thereto that is movable between an open position to expose the opening 142 and a closed position to cover the opening 142, includes disposing the voltage transformer 108 in the voltage transformer compartment 120 in a racked or drawn-out position (see FIGS. 2, 3 and 3A), when the door 144 is disposed in the open position; moving the door 144 to the closed position; actuating an interlock assembly 178 disposed on the door 144 (the switch handle 186 movably connected through a shaft) from a disconnected configuration (see FIG. 10) where the racking mechanism 176 is non-actuable to a test configuration (see FIG. 11) where the door 144 is secured in the closed position and the racking mechanism 176 is actuable; actuating the racking mechanism 178 to move the voltage transformer 108 from the racked or drawn-out position (see FIGS. 2, 3 and 3A) to the racked or drawn-in position (see FIG. 7); and actuating the interlock assembly 178 from the test configuration (see FIG. 11) to a service configuration (see FIG. 12) where the door 144 is secured in the closed position and the racking mechanism 178 is non-actuable.

A method for uninstalling a voltage transformer 108 from a voltage transformer compartment 120 within a front accessible switchgear enclosure 100 that is accessible only from a front side 100a of the enclosure 100, where the voltage transformer compartment 120 includes a plurality of walls, including a front wall 136 that has an opening 142 and a door 144 connected thereto that is movable between an open position to expose the opening 142 and a closed position to cover the opening 142, includes removing the voltage transformer 108 in the voltage transformer compartment 120 of the enclosure 100 from a racked or drawn-in position (see FIG. 7); actuating an interlock assembly 178 disposed on the door 144 from a service configuration (see FIG. 12) where the door 144 is secured in the closed position and the racking mechanism 178 is non-actuable to a test configuration (see FIG. 11) where the door 144 is secured in the closed position and the racking mechanism 178 is actuable such that the load is removed from the voltage transformer and simultaneously provides access to the racking out tool while keeping the door in the closed position; actuating the racking mechanism 178 to move the voltage transformer 108 from the racked or drawn-in position (see FIG. 7) to the racked or drawn-out position (see FIGS. 2, 3 and 3A); and actuating the interlock assembly 178 from the test configuration (see FIG. 11) to a disconnected configuration (see FIG. 10) where the racking mechanism 178 is non-actuable and the door 144 is movable from the closed position to the open position.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

Any other undisclosed or incidental details of the construction or composition of the various elements of the disclosed embodiment of the present invention are not believed to be critical to the achievement of the advantages of the present invention, so long as the elements possess the attributes needed for them to perform as disclosed. Certainly, one skilled in the electrical arts would be able to conceive of a wide variety of configurations and successful combinations thereof. The selection of these and other details of construction are believed to be well within the ability of one of even rudimentary skills in this area, in view of the present disclosure. Illustrative embodiments of the present invention have been described in considerable detail for the purpose of disclosing a practical, operative structure whereby the invention may be practiced advantageously. The designs described herein are intended to be exemplary only. The novel characteristics of the invention may be incorporated in other structural forms without departing from the spirit and scope of the invention. The invention encompasses embodiments both comprising and consisting of the elements described with reference to the illustrative embodiments. Unless otherwise indicated, all ordinary words and terms used herein shall take their customary meaning as defined in The New Shorter Oxford English Dictionary, 1993 edition. All technical terms shall take on their customary meaning as established by the appropriate technical discipline utilized by those normally skilled in that particular art area.

The invention claimed is:

1. A front accessible switchgear enclosure, comprising: a plurality of discrete functional compartments defined within the enclosure including a voltage transformer compartment and a cable connection compartment,
   wherein a portion of the enclosure contiguous with the voltage transformer compartment and the cable connection compartment defines an opening between the voltage transformer compartment and the cable connection compartment; and
   wherein a wall of the voltage transformer compartment is removably connected to the portion of the enclosure, such that the wall is entirely removable from the portion of the enclosure contiguous with the voltage transformer compartment and the cable connection compartment in order to facilitate access to the cable connection compartment from a front of the enclosure.

2. The front accessible switchgear enclosure of claim 1, wherein the wall includes an insulator bushing fixed thereto to facilitate connection between a voltage transformer disposed in the voltage transformer compartment and bus spouts disposed in the cable connection compartment.

3. The front accessible switchgear enclosure of claim 1, wherein the voltage transformer compartment comprises an inner sidewall and tracks that extend toward the front of the enclosure.

4. The front accessible switchgear enclosure of claim 3, wherein the opening is disposed in registration with a flap movably connected to the wall of the voltage transformer compartment to cooperatively facilitate operative communication between the voltage transformer compartment and the cable connection compartment during an arc flash event.

5. The front accessible switchgear enclosure of claim 4, wherein the wall includes an insulator bushing connected thereto that facilitates connection between a voltage transformer disposed in the voltage transformer compartment and bus spouts disposed in the cable connection compartment.

6. A method of accessing a cable connection compartment of a front accessible switchgear enclosure including a voltage transformer compartment wherein a portion of the enclosure contiguous with the voltage transformer compartment and the cable connection compartment defines an opening between the voltage transformer compartment and the cable connection compartment, the method further comprising:
   entirely removing a wall of the voltage transformer compartment that is aligned in registration with the opening cable connection compartment; and
   accessing the cable connection compartment through the opening that is defined by the portion of the enclosure that is contiguous to the voltage transformer compartment and the cable connection compartment.

7. The front accessible switchgear enclosure of claim 1, wherein the wall is removably connected to the portion of the enclosure proximate to the opening.

8. A front accessible switchgear enclosure, comprising:
- a plurality of discrete functional compartments defined by the enclosure including a voltage transformer compartment and a cable connection compartment;
- wherein a portion of the enclosure contiguous with the voltage transformer compartment and the cable connection compartment defines an opening between the voltage transformer compartment and the cable connection compartment; and
- wherein a wall of the voltage transformer compartment corresponds to an entire dimension of the opening between the voltage transformer compartment and the cable connection, such that the wall is entirely removable from the portion of the enclosure to facilitate access to the cable connection compartment from a front of the enclosure.

* * * * *